US008798915B2

(12) United States Patent
Dzubay et al.

(10) Patent No.: US 8,798,915 B2
(45) Date of Patent: Aug. 5, 2014

(54) SYSTEM AND METHOD FOR THE COLLABORATIVE COLLECTION, ASSIGNMENT, VISUALIZATION, ANALYSIS, AND MODIFICATION OF PROBABLE GENEALOGICAL RELATIONSHIPS BASED ON GEO-SPATIAL AND TEMPORAL PROXIMITY

(71) Applicants: Carl M. Dzubay, Southbury, CT (US); Bernard E. Gracy, Jr., Southbury, CT (US)

(72) Inventors: Carl M. Dzubay, Southbury, CT (US); Bernard E. Gracy, Jr., Southbury, CT (US)

(73) Assignee: Ancestralhunt Partners, LLC, Southbury, CT (US)

( * ) Notice: Subject to any disclaimer, the term of this patent is extended or adjusted under 35 U.S.C. 154(b) by 0 days.

(21) Appl. No.: 14/106,056

(22) Filed: Dec. 13, 2013

(65) Prior Publication Data

US 2014/0136530 A1 May 15, 2014

Related U.S. Application Data

(63) Continuation of application No. 13/375,922, filed as application No. PCT/US2010/037699 on Jun. 8, 2010.

(60) Provisional application No. 61/185,696, filed on Jun. 10, 2009.

(51) Int. Cl.
*G01C 21/00* (2006.01)

(52) U.S. Cl.
USPC ........................................................ 701/410

(58) Field of Classification Search
None
See application file for complete search history.

(56) References Cited

U.S. PATENT DOCUMENTS

| 8,370,955 | B2 | 2/2013 | Proctor et al. | |
|---|---|---|---|---|
| 2002/0107767 | A1 | 8/2002 | McClair et al. | |
| 2004/0148275 | A1 | 7/2004 | Achlioptas | |
| 2005/0198031 | A1 | 9/2005 | Pezaris et al. | |
| 2008/0140650 | A1 | 6/2008 | Stackpole | |
| 2008/0270431 | A1 | 10/2008 | Garbero | |
| 2009/0005987 | A1* | 1/2009 | Vengroff et al. | 701/300 |
| 2009/0064011 | A1 | 3/2009 | Abhyanker | |
| 2012/0221075 | A1* | 8/2012 | Bentwich | 607/45 |
| 2012/0310736 | A1* | 12/2012 | Vengroff et al. | 705/14.53 |

FOREIGN PATENT DOCUMENTS

| EP | 1550958 | 7/2005 |
|---|---|---|
| KR | 1020020007887 | 1/2002 |

* cited by examiner

*Primary Examiner* — Thomas Tarcza
*Assistant Examiner* — Adam Alharbi
(74) *Attorney, Agent, or Firm* — DeLio, Peterson & Curcio, LLC

(57) ABSTRACT

System, methods, apparatus and media for the geo-spatial capture and transcription of family trees, vital records, census records, land transfer records, cemetery records, and organizational membership records; for assigning deterministic and probabilistic relationships between people in geographic proximity; and for visualizing known, probable, and potential relationships in a geo-spatial context over time. Also disclosed are systems, methods, apparatus and media for organizing and analyzing genealogical information for searching and visualizing individuals and entities and their relationships to each other within a geo-spatial and temporal context. Further disclosed are systems, methods, apparatus and media for identifying a social networking site based on geo-spatial and temporal context data relating to individuals and entities and their relationships to each other.

30 Claims, 13 Drawing Sheets

ANIMATION
TIME STACKING

SYSTEM AND METHOD FOR THE COLLABORATIVE COLLECTION, ASSIGNMENT, VISUALIZATION, ANALYSIS, AND MODIFICATION OF PROBABLE GENEALOGICAL RELATIONSHIPS BASED ON GEO-SPATIAL AND TEMPORAL PROXIMITY

PRIORITY

This application is a continuation of U.S. patent application Ser. No. 13/375,922 filed Jun. 8, 2010 which claims priority to U.S. Provisional Application Ser. No. 61/185,696 filed on Jun. 10, 2009, which is hereby incorporated by reference in its entirety.

TECHNICAL FIELD

The invention relates, in general, to database schema design and processing, and, more particularly, to systems, methods, apparatus and media for organizing and analyzing genealogical information.

BACKGROUND ART

Genealogy is the study of a family's lineage. It often encompasses 5 dimensions:

Biological (Who)—Online and offline research into one's family tree. This may include collateral lines and through the use of DNA can include deep ancestral origins.

Temporal (When)—Researching and recording when our ancestors were born, baptized, married, had children, died, and were buried. This may also include capturing other major and minor life events that can be embodied in a timeline.

Socio-economical (What)—Researching, recording, and understanding the social and economic context in which our ancestors lived their lives. This may include religious and political party affiliations, religious and cultural practices, church membership, political offices held, military service and rank, group memberships, education, occupations held, supplier and customer relationships, income, investments, net worth, asset analysis, interests, attitudes, and opinions.

Historical (Why)—Researching and understanding the historical context within which our ancestors lived—social and religious movements, macro-economics, cultural, political, and technological trends, regional rivalries, war, et. al.

Geographical (Where)—Researching and recording the location of ancestral life events.

Much of a researcher's initial focus is on capturing the first two dimensions—Who and When. Where is almost incidental—a traceable source citation for future research. As researchers gain more experience and can devote the time—some will focus on the dimensions of What and Why to gain insight into their ancestors lives in context and maybe getting a deeper understanding of themselves in the process.

However, when you take into account available technology and the relative lack of mobility before the introduction of the steam train and the automobile, or where physical geography hindered mobility, or where geography and culture intersect—the Where dimension becomes the dominant dimension in your family tree. The Where determines the pool of potential mates. The Where determines access to food, water, energy, and raw materials. The Where influences one's economic opportunity but also one's risk profile with respect to war, crime, natural and man-made disasters, pestilence, disease, and famine.

Moreover location is an actual determinant in the probability that two people within geographic proximity are related. Tobler's (1970) first law of geography—that everything is related to everything else but near things are more related than distant things—has been rigorously verified in the field of geographical genetics. It has also been demonstrated in the field of geographical genetics that relatives will exhibit some degree of spatial proximity and spatial neighbors will exhibit some average excess of relatedness.

DISCLOSURE OF INVENTION

Bearing in mind the problems and deficiencies of the prior art, one or more objects of the present invention may be to provide an improved system and method for the geo-spatial capture and transcription of family trees, vital records, census records, land transfer records, cemetery records, and organizational membership records.

It may be another object of the present invention to provide a system and method for assigning deterministic and probabilistic relationships between people in geographic proximity.

A further object of the invention may be to provide a system and method for visualizing known, probable, and potential relationships in a geo-spatial context over time.

Still other objects and advantages of the invention will in part be obvious and will in part be apparent from the specification.

The above and other objects, which will be apparent to those skilled in the art, are achieved in the present invention which is directed to systems, methods, apparatus, computer readable media, non-transitory computer readable media and/or computer program products that identify and associate individuals by at least providing a first set of records associated with one or more individuals at a defined geographic location and a defined period of time, and providing a second set of records associated with individuals across multiple geographic locations and defined time periods. The method also includes selecting a desired demarcated area of the Earth, selecting a desired date range, and searching, identifying, and returning the set of individuals corresponding to the selected demarcated area, and date range. The method then includes associating relationships among the set of returned individuals who previously had no identified relationships in the first and second sets of records corresponding to the demarcated area and date range. The method steps of searching, identifying, returning and associating relationships are performed on a computing device, which may either be a stationary device, mobile device, or combinations thereof.

The first set of records may be selected from vital, historical, affiliation, group census, directory, and/or other records, while the second set of records may be from pedigree, genealogical, lineage, ancestral, family history, and/or other records. The relationships may be pedigree relationships, non-pedigree group or affiliation relationships.

The first set of records may be created by transcribing a series of geotagged digital images of inscribed memorials, extracting location of the transcribed geotagged digital images, and identifying physical proximity of the imaged inscribed memorials within a physically demarcated area. The user inputs determinable relationships between transcribed individuals.

In one or more embodiments, the first set of records may be created by transcribing a series of geotagged digital images of headstones, family plots, or other inscribed memorials within a cemetery. The first set of records may further be created by extracting location of the transcribed geotagged digital images, and identifying physical proximity of the imaged headstones and inscribed memorials within a physically demarcated area. The user inputs determinable pedigree based relationships between transcribed individuals, and inputs possible yet indeterminable (from the first and second sets of records) pedigree based relationships between transcribed individuals. Any possible yet indeterminable pedigree relationship between two individuals are propagated as a hypothetical syllogism to associate the relationships among the set of returned individuals who previously had no identified relationships in the first and second sets of records.

The memorial may be an inscribed battlefield memorial, town memorial, or other public memorials with a plurality of inscribed individuals. The first set of records may further include group affiliation of the transcribed individuals.

In another embodiment, the set of returned individuals have the same surname and the method further includes providing a table of surname commonality frequency for a defined geographic region within a specific period of time and using the table of surname commonality frequency to associate the relationships among the set of returned individuals who previously had no identified relationships in the first and second sets of records.

The method may include further identifying geographical locations in the records that include the individuals and are isolated, and using the identification of isolated geographical locations to associate the relationships among the set of returned individuals who previously had no identified relationships in the first and second sets of records. The isolated geographical locations may be separated by distance from other groups of individuals, or by the effects of weather, or may be defined by physical geographical barriers such as rivers, mountains, islands or deserts.

In another embodiment, the first or second set of records may include identifications of location of origin of an individual and the returned set of individuals are in contemporaneous geospatial proximity, and the method further includes identifying the preponderance of the location of origin of the returned set individuals, and using the preponderance of the location of origin of the returned set individuals to associate the location of origin relationships among the set of returned individuals who previously had no identified location of origin relationships in the first and second sets of records. The location of origin may be an ancestral city, town, village or neighborhood of origin. The identification of location of origin of an individual includes immigration or emigration records associated with one or more individuals.

In one or more embodiments, the first and second sets of records may be provided by a mobile device. Also, the method may include using the associated relationships to generate a family tree based on the multiple geographic locations and defined time periods.

In some embodiments the method may be performed on a social networking site. The social networking site may be directed to a specific function or purpose, or to a general purpose social networking site. The user may be provided with the results of the associated relationships among the set of returned individuals, at which point the user may realize the existence of a social networking site and then request to join the social networking site.

The present invention is further directed to systems, methods, apparatus, computer readable media, non-transitory computer readable media and/or computer program products for searching and visualizing individuals and entities and their relationships to each other within a geo-spatial and temporal context comprising providing two or more of the following sets of records: 1) a first set of records associated with one or more individuals at a defined geographic location and a defined period of time 2) a second set of records associated with one or more individuals across multiple geographic locations and defined time periods, 3) a third set of records of probable genealogical relationships among two or more individuals across multiple geographic locations and time periods, 4) a fourth set of historical records associated with one or more entities at a defined geographic location and a defined period of time, and 5) a fifth set of spatial, geographical, historical, and other records associated with one or more locations within a defined time period. The method then includes providing an association of at least two of the first, second, third, fourth and fifth set of records into linked and related data elements comprising individuals, entities, geographical location, date range of association, and their relationships. The method further includes selecting one or more desired individual attributes, selecting a desired demarcated area of the Earth, selecting a desired date range, and searching, identifying, and returning the linked and related data elements of individuals and entities corresponding to the selected individual attributes, demarcated area, and date range. The method then includes displaying one or more of a) the relationship between the returned individuals and entities within a geo-spatial and temporal context, b) the related data elements of the returned individuals and entities within a geo-spatial and temporal context and c) the resolution of the location information associated with the returned individuals and entities within a geo-spatial and temporal context.

In one or more embodiments, the first set of records may include, but are not limited to, vital, historical, affiliation, group census, directory, and other records. The second set of records may include, but are not limited to, pedigree, genealogical, lineage, ancestral, family history, and other records. In certain embodiments, the current location of the user may be derived from a global positioning systems receiving device and/or the current location of the user may be a geocoded street address.

In various embodiments the desired demarcated area of the Earth may be identified as one or more of: the current location of the user on the Earth (latitude and longitude) and a maximum drive time T; the current location of the user on the Earth (latitude and longitude) and a maximum walking time T; a specific point on the Earth (latitude and longitude) and a radius R; a specific physical address and a radius R.; a current political boundary; the political boundary or boundaries extant in the desired date range; a cadastral map or maps extant in the desired date range; a historical map or maps extant in the desired date range; a street number range for a defined street in a political boundary extant in the desired date range; a census enumeration district extant in the desired date range; a legislative district or districts extant in the desired date range; a well defined parcel associated with an historical event such as a battlefield; a USGS Feature Name and radius R; a user defined irregular polygon. The desired demarcated area of the Earth may also be identified as an established neighborhood extant in the desired date range; for example, Beekman, Carnegie Hill, Central Park South, Chelsea. Chinatown, Clinton, East Harlem. East Village, Financial District, Gramercy Park, Greenwich Village, Harlem, Inwood, Little Italy, Lower East Side, Midtown East, Morningside Heights, Midtown West, Murray Hill, Soho, Sutton Area, Tribeca, Upper East Side, Upper West Side, Washington Heights, and West Village in New York City. The desired demarcated area of the Earth also contains a USGS Feature Class.

The desired individual attribute may relate to an individual's major life events, such as birth, existence, marriage, parentage, immigration to, emigration from, or death, e.g., all people who lived within 2 miles of a particular Church between 1860 and 1880. The desired individual attribute may also be a surname or substring of a surname, or group affiliation or affiliations. The latter include, e.g., church memberships, fraternal orgs, veterans orgs, public service orgs, employment affiliation, creed, or all members of the G.A.R who lived between 1825 and 1900 in Connecticut. The desired individual attribute may also be the individual's birth location, e.g., all individuals in the desired geographic area who were born in Piaggine Italy. Further, the desired individual attribute may be one or more of country of origin, the individual's port of emigration, the individual's port of immigration, gender, racial classification, age range, naturalization status, year of emigration or immigration, occupation, life experience shared by two or more individuals and membership in a family. The desired individual attribute may be individual record ownership status, and a record may be designated as public or private to the user. The desired individual attribute may also relate to any combination of the above listed attributes.

The entity may be a physical structure associated with one or more individual's habitation, interaction, or activity, a port of embarkation or disembarkation, a specific instance of a mode of transportation, or a physical structure that memorializes one or more individual's lives, habitation, interactions, or activities.

The association of the first, second, third, fourth and fifth set of records into linked and related data elements may be created and maintained in a centralized database management system, or may be maintained with a federated database management system.

A representation of returned individuals, entities, their relationships to each other, and related data elements may be displayed as hovering over a 3 dimensional rendering of the Earth within a user selectable time period. The representation of an individual or entity may be displayed as connected to one or more associated locations within the 3 dimensional rendering of the Earth is a function of the resolution of the associated location. For example, an individual associated with a location that is just "Pennsylvania" would be at a height above the centroid of the state of Pennsylvania, "New York City" would be at a height above the centroid of NYC, "Battery Park" would be at the height above the centroid of BP. An associated location may be displayed as connected with a physical location on the surface of the 3 dimensional rendering of the Earth if and only if the location is defined by or derived to a latitude/longitude pair or a postal address that includes a valid street number, street name, city, state/province, country, and postal code.

An associated location may be displayed as hovering above the centroid of the demarcated area on the surface of the 3 dimensional rendering of the Earth for partial addresses, street number ranges, current and past political boundaries, historical maps, census enumeration districts, current and past legislative districts, user defined polygons, cadastral maps, established neighborhoods and other publicly defined parcels. An associated location may be displayed as hovering above the centroid of the demarcated area on the surface of the 3 dimensional rendering of the Earth at varying heights based on the resolvability and accuracy of the source location to be geocoded.

If no associated location is specified for an individual or entity, a default location is assigned for that individual or entity and is displayed as outside the upper bound of the exosphere of the 3 dimensional rendering of the Earth.

The representation of returned individuals and entities may be displayed as connected to one or more associated locations through colored line segments. The representation of returned individuals may be displayed as connected to each other through colored line segments. The representation of returned individuals and entities may be displayed as connected to each other through colored line segments, and/or as connected to related data elements through colored lined segments. The colored line segment may denote the type of association between two or more representations of individuals.

The set of determinable pedigree-based associations between two or more representations of individuals may be displayed as including relative to relative, relative to non-relative, relative to relative-by-marriage, non-relative to non-relative, and combinations thereof. For instance, these relationships may include, but are not limited to, parent to child, sibling to sibling, spouse to spouse, grandparent to grandchild, aunt/uncle to niece/nephew, cousin to cousin, parent-in-law to son/daughter-in-law, and the like, and even combinations thereof).

The association of pedigree between two or more individuals may alternatively be displayed as possible yet indeterminable. The association of two or more individuals may be displayed as including an identifiable group affiliation, which may include a historical group affiliation or a user defined group affiliation. For instance, the display of representation of returned individuals, entities, their relationships to each other, and related data elements may be displayed as hovering over a 3 dimensional rendering of the Earth in an animated time sequence.

The method may further include graphically linking to the representation of an individual, entity, or related data elements further data elements associated with an individual, entity, or related data elements through a colored line segment. The colored line segment denotes the type of related data element to the representation of an individual or related data elements. The method also may further include enabling or disabling the graphical linking to the representation of an individual to any other representation of an individual or related data elements.

The returned linked and related data elements of individuals and entities are displayed as corresponding to the selected individual attributes, demarcated area, and date range may be used as the plurality of records to narrow or extend the set of returned linked and related data elements of individuals and entities.

In one or more embodiments, the methods of the invention may be performed on a mobile device, whereby the results of the method are displayed to a user on the mobile device. Also, the linked and related data elements of individuals and entities corresponding to the selected individual attributes, demarcated area, and date range may be conflated into a family tree.

In various embodiments, the method may be performed on and the results displayed on a social networking site. The social networking site may be directed to a specific function or purpose (e.g., a social networking site directed solely to searching, establishing, generating and/or linking a family tree and/or familial lineage), or to a general purpose social networking site (e.g., a social networking site that includes a feature for searching, establishing, generating and/or linking a family tree and/or familial lineage).

A user of the invention may realize the existence of a social networking site due to the displayed results, whereby the user may request to join the social networking site. The computing device itself may identify one or more social networking sites based on the input data, or it may identify one or more social networking sites based on the selected individual attributes, demarcated area, and date range. In either instance, a user may request to join one or more of the identified social networking sites.

The present invention is also directed to methods of identifying a social networking site based on geo-spatial and temporal context data relating to individuals and entities and their relationships to each other. The methods at least include inputting into a computing device various sets of records associated with individuals across multiple geographic locations and defined time periods, and inputting a geo-based query into the computing device that at least includes identifications of a desired demarcated area of the Earth and a desired date range selected by a user. The computing device identifies a social networking site based on the input geo-based query and outputs an identification of the social networking site to a user of the invention.

In one or more embodiments, the various sets of records input into the computing device include a first set of records associated with one or more individuals at a defined geographic location and a defined period of time, and a second set of records associated with individuals across multiple geographic locations and defined time periods. Still further records may include a third set of records of probable genealogical relationships among two or more individuals across multiple geographic locations and time periods, a fourth set of historical records associated with one or more entities at a defined geographic location and a defined period of time, and a fifth set of spatial, geographical, historical, and other records associated with one or more locations within a defined time period. An association may be provided of at least two of the first, second, third, fourth and fifth set of records into linked and related data elements comprising individuals, entities, geographical location, date range of association, and their relationships.

The method may further include searching, identifying, and returning a set of individuals corresponding to the selected demarcated area and date range. Relationships may also be associated among the set of returned individuals who previously had no identified relationships in the first and second sets of records corresponding to the demarcated area and date range.

The geo-based query may also include one or more desired individual attributes. In these embodiments, the computing device may search, identify and return the linked and related data elements of individuals and entities corresponding to the selected individual attributes, demarcated area, and date range. Also, one or more of the following may be displayed: a) the relationship between the returned individuals and entities within a geo-spatial and temporal context, b) the related data elements of the returned individuals and entities within a geo-spatial and temporal context and c) the resolution of the location information associated with the returned individuals and entities within a geo-spatial and temporal context.

These embodiments of the invention may be performed on a mobile device, whereby the results of the method are displayed to a user on the mobile device. Alternatively, the methods may be performed on a stationary device. The social networking site may be a general purpose social networking site, or it may be a specific function or purpose social networking site (e.g., directed to the specific function or purpose of generating or searching one or more family trees or family lineage).

In certain embodiments a variety of different social networking sites are identified, whereby a user may request to join one or more of such social networking sites.

The present invention is further directed to computer readable medium embedded with a computer program of instructions executable by the computer, program storage devices, and computer program products all for performing the various embodiments and methods of the invention as discussed above and in more detail below.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

MODES FOR CARRYING OUT THE INVENTION

Figure 1:
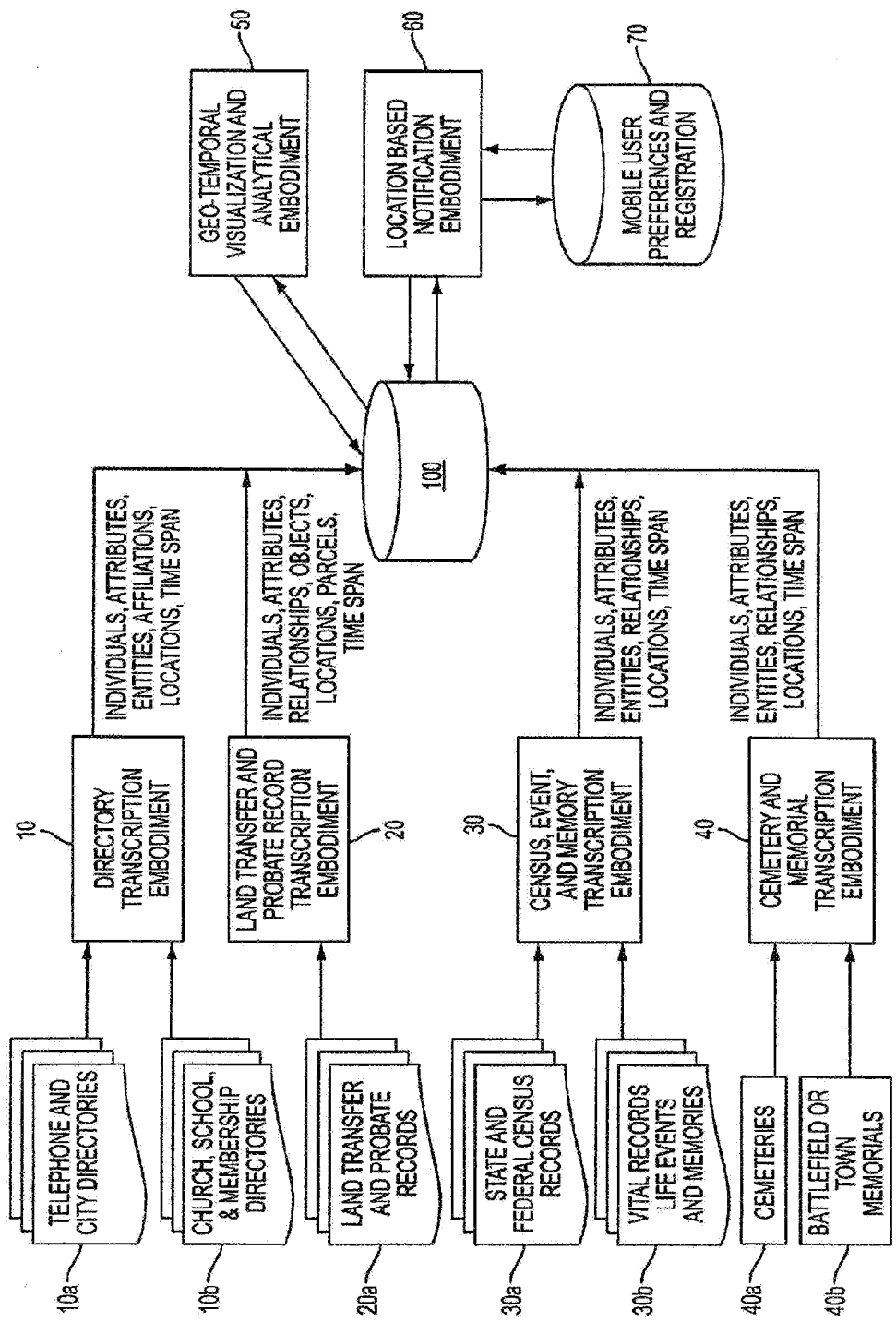
FIG. 1 is a schematic of the acquisition and handling of information in a system of the present invention for organizing and analyzing genealogical information.

The invention provides systems, methods, apparatus, computer readable media, non-transitory computer readable media and/or computer program products that:

Assist users in the geo-spatial capture and transcription of family trees, vital records, census records, land transfer records, cemetery records, and organizational membership records;

Assist users in assigning deterministic and probabilistic relationships between people in geographic proximity; and Assist users in visualizing known, probable, and potential relationships in a geo-spatial context over time.

Geographic distance is a significant and frequently primary determinant of genetic variation between populations within a relatively small geographic region. Geographic distance limits migration such that the genetic similarity between populations decreases with increasing geographic distance.

Transportation technology and infrastructure limit migration the further one goes back in time. The physical geography, topography, and climate also limit migration.

EXAMPLES

Cemetery stone—here the geo-spatial proximity is deterministic. People buried with the same surname in geo-graphic proximity are related. Cemetery stones sometimes indicate family patterns, but sometimes they do not. For example, a male buried next to a female under one headstone could be husband-wife, brother-sister, father-daughter, aunt/uncle-niece/nephew, cousin-cousin, and the like, without any other identifying information.

Cemetery plot—a cemetery plot is similar to a cemetery stone with the exception that it is a larger contiguous demarcated geo-spatial area that likely contains more than one stone and may contain stones with more than one surname. For example, if a cemetery plot contains headstones with the name Gracy, Dutton, and Munson, it may be assumed that these people are somehow related even if it is not apparent from the information contained on the stones. Moreover, if deterministic relationships can be ascertained with a subset of the people in a plot, then the probabilistic relationship with one individual can be propagated to all individuals within the plot.

Cemetery—applying the first law of geography to matched surnames within a contiguous cemetery over time indicates a higher likelihood the people are somehow related, as well as the deterministic relationships of those individuals.

Neighborhoods—are geographically localized communities within a larger village, suburb, town, or city. Neighborhoods are often social communities with considerable face-to-face interaction among members. The spatial division of cities into districts or neighborhoods is one of the few universals of urban life from the earliest cities to the present. In the words, of the urban scholar Lewis Mumford, "Neighborhoods, in some primitive, inchoate fashion exist wherever human beings congregate, in permanent family dwellings; and many of the functions of the city tend to be distributed naturally—that is, without any theoretical preoccupation or political direction—into neighborhoods." Most of the earliest cities around the world as excavated by archaeologists have evidence for the presence of social neighborhoods.

Neighborhoods are typically generated by social interaction among people living near one another. In this sense, they are local social units larger than households that are not directly under the control of city or state officials. In some preindustrial urban traditions, basic municipal functions such as protection, social regulation of births and marriages, cleaning and upkeep are handled informally by neighborhoods.

Neighborhoods in preindustrial cities often had some degree of social specialization or differentiation. Ethnic neighborhoods were important in many past cities and remain common in cities today. Economic specialists, including craft producers, merchants, and others, could be concentrated in neighborhoods, and in societies with religious pluralism, neighborhoods were often specialized by religion. One factor contributing to neighborhood distinctiveness and social cohesion in past cities was the role of rural to urban migration. This was a continual process in preindustrial cities, and migrants tended to move in with relatives and acquaintances from their rural past.

For example, in part because of the social and political divisions of the Italian peninsula, southern Italian villages tended to be isolated and insular, and new immigrants tended to preserve this isolation in their new country, clustering together in close enclaves. In some cases, the population of a single Italian village ended up living on the same block in New York, or even the same tenement building, and preserved many of the social institutions, habits of worship, grudges, and hierarchies from the old country. In Italy, this spirit of village cohesion was known as campanilismo—loyalty to those who live within the sound of the village church bells.

There can be a very precise geo-demographic identification. Mulberry Street in New York, for example, became distinctly people from Naples; Mott Street between Broome and Grand was claimed by the Calabresi; Hester Street was Apulian. The length of Elizabeth Street was not only Sicilian, it was settled by town: from south to Spring, the immigrants came from Palermo; from Spring to Grand they came from Siacca; from Grand to Hester, from Messina.

Therefore if one can identify the predominant ethnic, country, regional, and village of origin within a defined geo-spatial area and timeframe, then any random individual within the geo-spatial area and timeframe will have a probable geographic relationship to the same country/region/village of origin.

Villages. Towns, and Regions—based on time and relative geographic isolation and limited transportation technology/mobility, the first law of geography applies. It has been shown that the most common and proximal cause of spatial structure is [the] limited dispersal of individuals. Limited dispersal causes genetic isolation by distance to build over generations. For example, within a population, even if initially the spatial distribution of individual genotypes were random, limited dispersal means that individual genotypes in the next generation will not be. Then, when dispersal is limited during the mating cycle of the next generation—there is an excess of matings among spatially proximal individuals who are related beyond average. The progeny of the third generation will be more intensely spatially structured than the second, and so on. Relatives will exhibit some degree of spatial proximity and spatial neighbors will exhibit some average excess of relatedness. Note that the above identifies regions instead of specific counties or states. Political boundaries at this level are less important in location based genealogy. For example, if a family is located in Northwest CT, then the genealogical region of interest could include east central New York, southwestern Massachusetts, Litchfield County, western Hartford County, and northern New Haven County.

Super regions and Countries—wider dispersal patterns lower the probability of relatedness. However, by employing knowledge of surname frequencies and historical migration patterns one can identify likely individuals of potential interest.

As used herein, the following terms are defined:

An address is defined as providing a means of locating people, structures and other spatial objects.

A cadastral map is a comprehensive register of the metes-and-bounds of real property of a country. A cadastre commonly includes details of the ownership, the tenure, the precise location (some include GPS coordinates), the dimensions (and area), the cultivations if rural and the value of individual parcels of land.

A date range is defined as the period of time between two dates. A date can be defined as just a year; a month and a year; a specific month, day, and a year; and a specific time, month, day, and year where time is defined in HH:MM:SS (hours, minutes, seconds).

A surname is defined as a name shared in common to identify the members of a family, as distinguished from each member's given name. Also called family name, last name.

A centroid is the term given to the center of an area, region, or polygon.

Geotagged means the process of adding geographical identification meta-data to various media such as photographs and video. This meta-data usually consists of latitude and longitude coordinates, though they can also include altitude, bearing, accuracy data, and place names.

Pedigree means a list of ancestors, a record of ancestry, a family tree.

Genealogical means of or relating to genealogy.

The present invention is directed to:

(1) Systems, methods, apparatus, computer readable media, non-transitory computer readable media and/or computer program products that capture an individual's vital records, life events, affiliations, and other information in a geo-spatial and temporal context and assign, derive, and propagate deterministic and probabilistic relationships attributes among other individuals as a function of geographic proximity, surname match, surname frequency, and/or historical geographical migration patterns. Sources of information may come from cemetery stones, cemetery plots, cemeteries, federal and state census, city directories, and organizational directories.

(2) Systems, methods, apparatus, computer readable media, non-transitory computer readable media and/or computer program products for users to record memories in text, audio, audio-visual, photographs, scanned documents, et. al. associated with a particular location for a defined moment or duration in time. The various embodiments of the invention are capable of organizing separate memories from different individuals within the same time frame or in different timeframes. This would include home, school, church, organization, employment memories, and other memories associated with a physical location such as battles, skirmishes, sports, natural disasters, human events, or other historical events (e.g. where were you when Kennedy was shot).

(3) Systems, methods, apparatus, computer readable media, non-transitory computer readable media and/or computer program products for conducting geo-spatial/temporal queries based on surname and other attributes for the data captured in (1) and (2). For example:

Display in time sequence all individuals and associated locations with the surname Emmons in a region 50 miles around Litchfield, Conn. between 1718 and 1920. (Variables implemented may include, for instance, center point of region (address or lat/long), radius, MM/DD/YYYY start, MMDDYYYY end).

Display all Civil War veterans buried in New Haven County (Variables implemented may include, for instance, attribute and defined county polygon).

Display all people living between address range 1 and address range 2 between MMDDYYYY(1) and MMDDYYYY(2) where the street is fixed.

Display all people living in neighborhood region 0.05 miles round between MMDDYYYY(1) and MMDDYYYY(2). (Variables implemented may include, for instance, address, radius, date range. Note date range may be the same indicating a point in time (e.g. census day). A variable may include political boundaries (village, town, city, county, state, region (e.g. New England, Middle Atlantic, Southeast, the Confederacy) and Country).

Display all people living in neighborhood region 0.05 miles round or between address range 1 and address range 2 between MMDDYYYY(1) and MMDDYYYY(2) and the country/region/city/town/village they were living in between MMDDYYYY(3) and MMDDYYYY(4). (To infer country/region/village of origin).

(4) Systems, methods, apparatus, computer readable media, non-transitory computer readable media and/or computer program products that display and associate in a geo-spatial and temporal context the data captured in (1) and (2) and queried in (3).

(5) Systems, methods, apparatus, computer readable media, non-transitory computer readable media and/or computer program products that enable multiple users to collaboratively create, edit, describe, modify, and merge associations between separate location-based clusters of information.

(6) Systems, methods, apparatus, computer readable media, non-transitory computer readable media and/or computer program products that alert users to geographically relevant data captured in (1) and (2) based on their current geographic location on devices with mobile GPS technology and broadband connectivity such as, for example, laptops or smartphones. Furthermore the various embodiments of the present invention provide the ability for users to set parameters of interest to establish the alerts such as distance, timeframe, surname(s), organizational affiliation, life events, historical events, ethnicity.

(7) Systems, methods, apparatus, computer readable media, non-transitory computer readable media and/or computer program products that enable individuals to associate data captured in (1) and (2) into coherent geo-spatial applications, such as, a thematically integrated historical tour. For example, the various embodiments of the invention provide the means for users to associate individual memories of a battle into a self-directed battlefield tour that one takes with their GPS and broadband enabled smartphone. Another example is the means for users to associate mafia hits in a tour of New York City or Chicago. Moreover, the present invention provides the means for individuals to monetize these coherent geo-spatial applications with location based advertising. The invention provides a means for signing up geographically relevant advertisers such as stores, restaurants, museums, and other parties to advertise their services. For example, if a user is taking a historical tour then ads for the local establishments would appear to such user.

The present application describes several illustrative embodiments related to geo-spatial and temporal data capture including those related to cemetery transcription, census record transcription, and general location based memory capture as described in (1) and (2). Certain embodiments describe one or more embodiments of the invention that allow a user to conduct and visualize the results of geo-spatial, temporal, and surname based queries that are described in (3), (4), and (5). In certain other embodiments, the user is able to be alerted to their geo-spatial proximity to location based information based on pre-established preferences or thematic tours as described in (6) and (7).

It should be appreciated and understood that the present invention may be embodied as systems, methods, apparatus, computer readable media, non-transitory computer readable media and/or computer program products. The present invention may take the form of an entirely hardware embodiment, an entirely software embodiment (including firmware, resident software, micro-code, etc.) or an embodiment combining software and hardware aspects that may all generally be referred to herein as a "circuit," "module" or "system." The present invention may take the form of a computer program product embodied in one or more computer readable medium(s) having computer readable program code embodied thereon.

One or more computer readable medium(s) may be utilized, alone or in combination. The computer readable medium may be a computer readable storage medium or a computer readable signal medium. A suitable computer readable storage medium may be, for example, but not limited to, an electronic, magnetic, optical, electromagnetic, infrared, or semiconductor system, apparatus, or device, or any suitable combination of the foregoing. Other examples of suitable computer readable storage medium would include, without limitation, the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. A suitable computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computing device (such as, a computer), partly on the user's computing device, as a stand-alone software package, partly on the user's computing device and partly on a remote computing device or entirely on the remote computing device or server. In the latter scenario, the remote computing device may be connected to the user's computing device through any type of network, including a local area network (LAN) or a wide area network (WAN), or the connection may be made to an external computing device (for example, through the Internet using an Internet Service Provider).

The present invention is described herein with reference to flowchart illustrations and/or block diagrams of methods, apparatus (systems), computer readable media, non-transitory computer readable media, and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computing device (such as, a computer), special purpose computing device, or other programmable data processing apparatus to produce a machine, such that the instructions, which execute via the processor of the computing device or other programmable data processing apparatus, create means for implementing the functions/acts specified in the flowchart and/or block diagram block or blocks.

These computer program instructions may also be stored in a computer readable medium that can direct a computing device, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computing device, other programmable data processing apparatus, or other devices to cause a series of operational steps to be performed on the computing device, other programmable apparatus or other devices to produce a computer implemented process such that the instructions which execute on the computing device or other programmable apparatus provide processes for implementing the functions/acts specified in the flowchart and/or block diagram block or blocks.

It should be appreciated that the function blocks or modules shown in the drawings illustrate the architecture, functionality, and operation of possible implementations of systems, methods and computer program media and/or products according to various embodiments of the present invention. In this regard, each block in the drawings may represent a module, segment, or portion of code, which comprises one or more executable instructions for implementing the specified logical function(s). It should also be noted that, in some alternative implementations, the functions noted in the block may occur out of the order noted in the figures. For example, the function of two blocks shown in succession may, in fact, be executed substantially concurrently, or the blocks may sometimes be executed in the reverse order, depending upon the functionality involved. It will also be noted that each block and combinations of blocks in any one of the drawings can be implemented by special purpose hardware-based systems that perform the specified functions or acts, or combinations of special purpose hardware and computer instructions. Also, although communication between function blocks or modules may be indicated in one direction on the drawings, such communication may also be in both directions.

Referring to the drawings, each of the embodiments of the present invention utilize a common database 100 to store and manage location based genealogical, family history, memories, facts, events, and other related information organized in a geo-spatial, temporal, and social network context. Beyond standard genealogical programs which organize, search, and visualize data based on biological relationships over time—the system provides a capability to define, leverage, and associate geo-spatial, temporal, and other user-defined attributes (meta-data) to recorded individuals, objects, and entities; and to use those attributes to query, visualize, analyze, and/or update establish probable familial and social networks in space and time.

Figure 2:
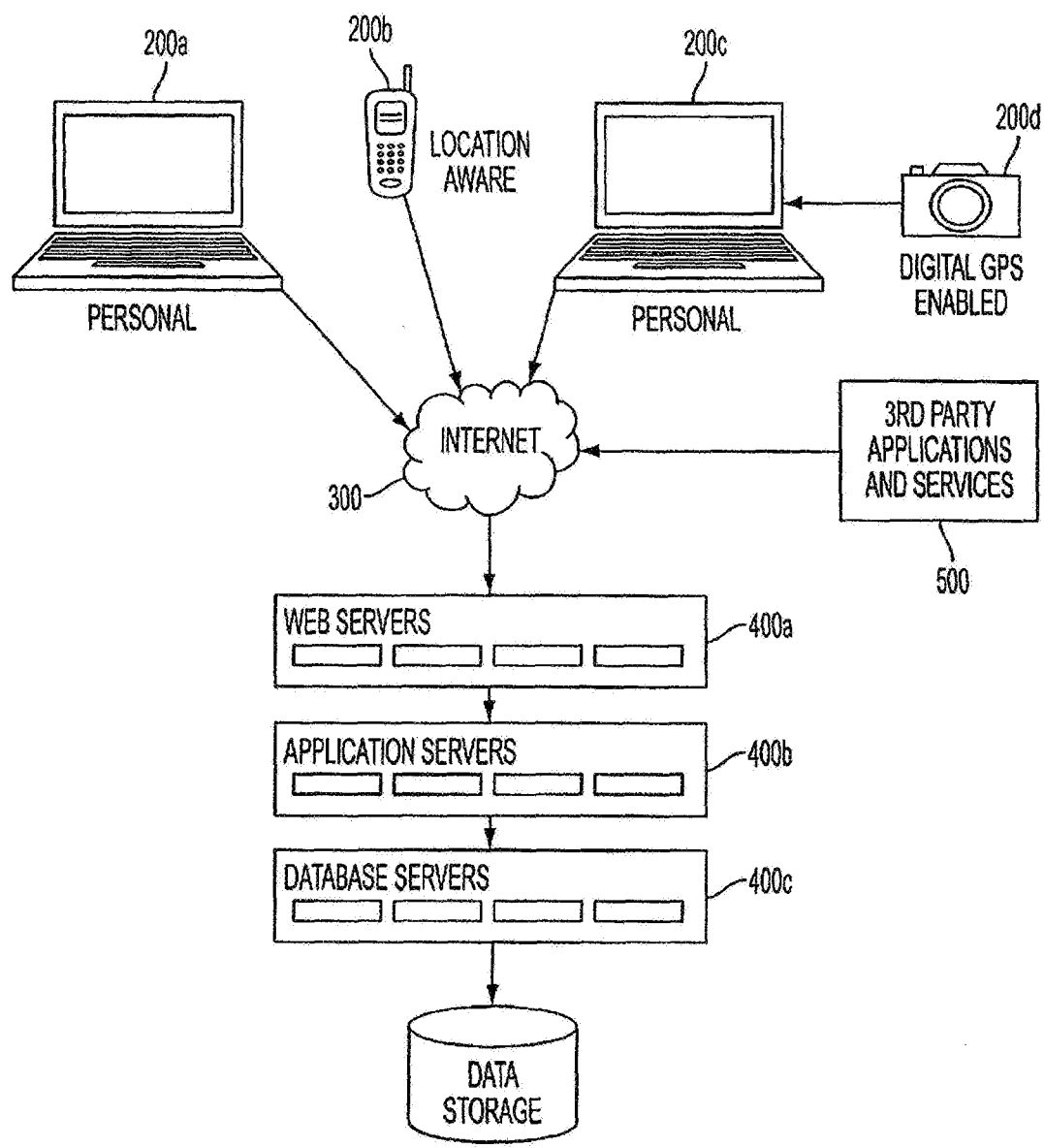
FIG. 2 is a schematic of an architecture of the system of FIG. 1.

FIGS. 1 and 2 respectively illustrate logical architecture and system architecture suitable for use with and in the various embodiments of the invention for organizing and analyzing genealogical information. The database 100 is preferably a relational database that is logically centralized but physically distributed. The database 100 receives data inputs from a variety of disparate sources 10-70 et al. and organizes such data in a coherent manner. The relational structured database 100 is specifically designed to capture data and events with regards to geographic location and time or time span. The data is indexed such that it can be efficiently searched geospatially, in time, by various data elements and combinations thereof.

Furthermore, referring to FIG. 2 the invention provides a means for information terminals with embedded Global Positioning Systems (GPS) 200*a-d* and broadband internet 300 access to be notified of their geo-spatial proximity to locations associated with recorded individuals, objects, and entities in that database based on pre-established user preferences associated with the aforementioned attributes.

The various embodiments of the invention all access the common database 100 and provide a user interface and workflow by various means. The database is securely hosted behind a firewall and is accessed only via specific functionality provided by servers 400a-c including, for instance, server hosted web applications, web client applications or database servers that interact with exposed web based application programming interfaces.

Specifically, the data collection embodiments provide novel directed user workflows designed to efficiently transcribe and derive entity and attribute information and store it in the common format. The workflows are designed to allow the user to capture information that is discernable from the various sources but is generally not captured nor displayed by traditional methods.

An additional set of embodiments provide the means for users to retrieve information and create insight from the data that has been collected. These embodiments provide novel abilities to query the data interactively and to visualize the results in 2 or 3-dimensional geo-spatial and temporal context.

The system is web based and utilizes a storage means to record individual, entity, and object information as well as the associated attributes and inbound/outbound relationship metadata. The storage means will be accessible via the above embodiments. The embodiments encapsulate the workflows, conditional logic, and web-enabled browser-based user interface to allow a global base of users to collaboratively collect, assign, visualize, analyze, and modify probable genealogical and affiliate relationships in a geo-spatial and temporal context.

Additional embodiments will also expose a service based application programming interface (API) that can be called from remote clients that have a resident user interface application. These remote client applications may be developed either as an integral part of the system or may be third party applications 500 interacting with the system.

Figure 3A:
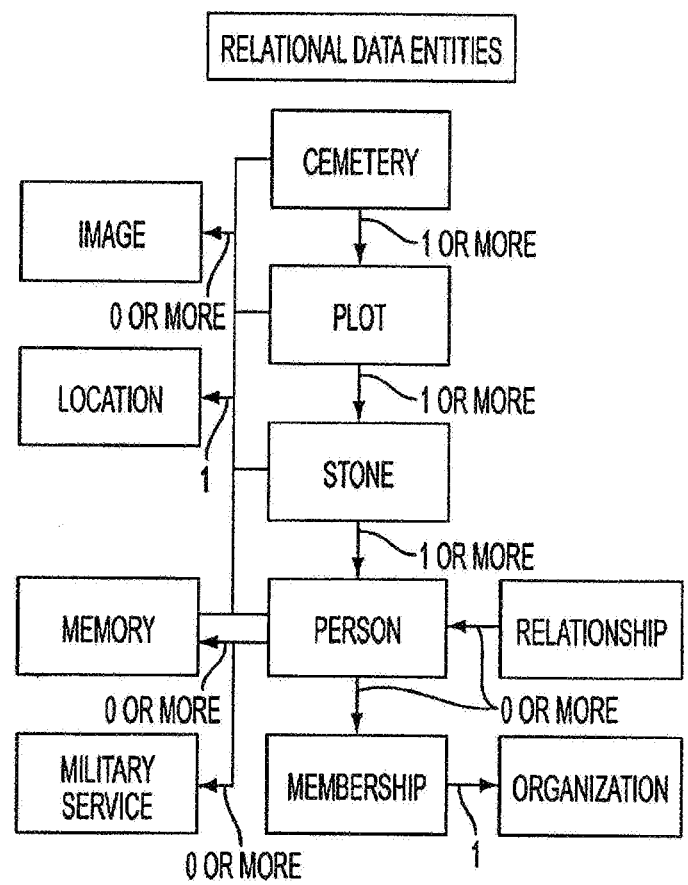
FIG. 3a is a schematic of the relational data elements of a memorial or plot used in the system of FIG. 1.
Figure 3B:
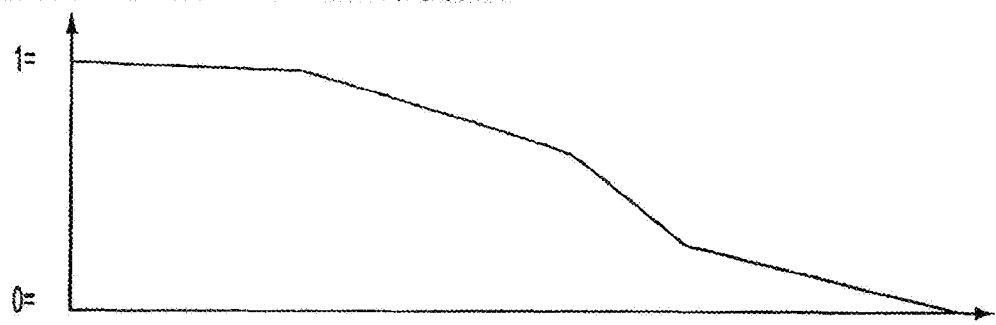
FIG. 3b is a plot of the general relationship of individuals as a function of geo-spatial proximity.
Figure 3C:
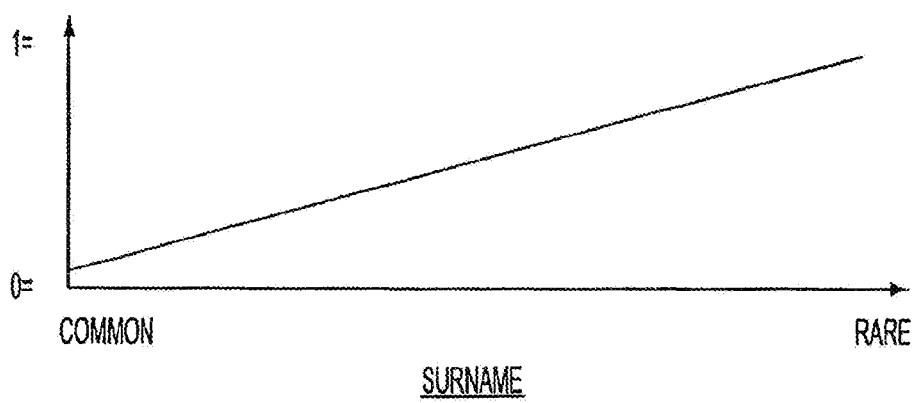
FIG. 3c is a plot of the general relationship of individuals as a function of geo-spatial proximity and surname frequency.

FIGS. 3a-c illustrate one or more embodiments of the invention for Cemetery and Memorial Transcription that allows one or more individuals to geo-spatially and temporally capture and archive information and attributes associated with individuals as well as deterministic and probabilistic relationships of those individuals to other individuals, organization, and other entities. As shown in FIG. 3a, a variety of different relational data elements may be used in accordance with the invention including, but not limited to, cemetery, plot and/or stone data and any data relating to images and/or locations associated therewith, as well as data relating to an identification of a person(s), relationships, memorials, organizations, memberships, military service, and the like.

These embodiments contain the workflow and conditional logic to capture and derive information and attribute and relationship meta-data associated with the relational data entities associated with a cemetery or memorial. The following information and meta-data elements will be populated as driven by the workflow in the user experience in the embodiment:

Relationships

Family history is generally represented by a biological or genetic family tree (also called a "pedigree"), which shows the past and present members of the family joined together by a series of links that help in ascertaining their relationship to each other, and the location, documentation and recording of a family history.

One or more embodiments of the invention extend the definition of relationships beyond deterministic biological, marital, and legal relationships that are typically associated with genealogy. In the various embodiments of the invention, an attribute of fuzzy relationships is/are generated and implemented in the invention. The fuzzy relationship(s) data is a form of multi-valued data derived from fuzzy (i.e., probable) data set theories for providing approximate reasoning as compared to precise reasoning. Just as in fuzzy set theory, the set membership values can range (inclusively) between 0 and 1, in fuzzy logic the degree of truth of a statement can range between 0 and 1 and is not constrained to the two truth values {true, false} as in classic predicate logic.

As will be described in more detail below, this fuzzy relationship(s) data may be used to determine Relationships between people and events geo-spatially and over time. In so doing, unique family trees may be generated in accordance with the invention using this Relationship data whereby such family trees will have people and event related branches that are generated geo-spatially and over time.

The fuzzy relationship data sets are used in one or more embodiments of the invention to determine whether or not two or more people are "somewhat related". This is accomplished by determining whether two predetermined fuzzy data sets intersection one another. These predetermined fuzzy data sets include Geo-Spatial Proximity (i.e., the relationship between two people at a moment in time) and Surname Frequency. FIG. 3b shows the plotted relationship of individuals as a function of Geo-Spatial Proximity, while FIG. 3c shows the plotted relationship of individuals as a function of Geo-Spatial Proximity and Surname Frequency.

In accordance with one or more embodiments of the invention, the following fuzzy logic equation may be used to determine whether or not two individuals are to some degree related. The two individuals are represented by the tuple, namely, surname(1), location(1), and time(1); and surname (2), location(2), and time(2), where time(2) is greater than or equal to time(1). The degrees to which such two individuals may be related include, but are not limited to, related, somehow related, most likely related, may be related, may be unrelated, most likely unrelated, somehow unrelated, and unrelated.

The fuzzy logic equation(s) for determining whether or not two individuals are to some degree related may be as follows:

IF location (1) and location (2) are within the same fixed populated fixed centroid (e.g. gravestone, graveplot, memorial), THEN the individuals are somehow related.

IF location (1) and location (2) are within a variably populated fixed centroid (a home) AND time(1) equals time (2), THEN the individuals are most likely related.

IF location (1) and location (2) are within a defined variably populated variable centroid (e.g. neighborhood, village) AND time(2) is greater than time (1)+3 generations (75 years), THEN the individuals may be related.

IF surname(1) matches surname(2) AND surname(1,2) is NOT COMMON AND location (1) and location (2) are within a defined variably populated variable centroid (e.g. neighborhood, village) AND time(2) is greater than time (1)+3 Generations, THEN the individuals are most likely related.

If surname(1) matches surname(2) AND location(1) is near location (2) AND time(2) is greater than time(1)+3 Generations AND time(2) is less than the year 1920, THEN the individuals may be related.

If surname (1) matches surname (2) AND surname(1,2) are RARE, THEN the individuals may be related.

If surname (1) matches surname (2) AND surname (1,2) is RARE AND location (1) is near location (2), THEN the individuals are most likely related.

If surname (1) matches surname (2) AND the surname is COMMON AND location (1) is far from location (2) AND time(2) is greater than time(1), THEN the individuals may be unrelated.

If surname (1) does not match surname (2) AND location (1) is far from location (2), THEN the individuals are most likely unrelated.

The one or more embodiments of the invention provide the concept of degrees of relatedness based on the use of fuzzy logic, which is collapsed to the binary state of related or unrelated as more information or data becomes available. The value to genealogist of fuzzy relationships is that the invention provides documented clues to potential or possible familial relationships based on geographic and temporal proximity without having to commit these "leads" to a traditional genealogical database that is designed around pedigrees. The invention therefore provides a valuable "lead generation" tool for genealogists and family historians. Moreover, there is a network effect in that the more geo-spatially based information available, the more valuable the information becomes.

Figure 4:
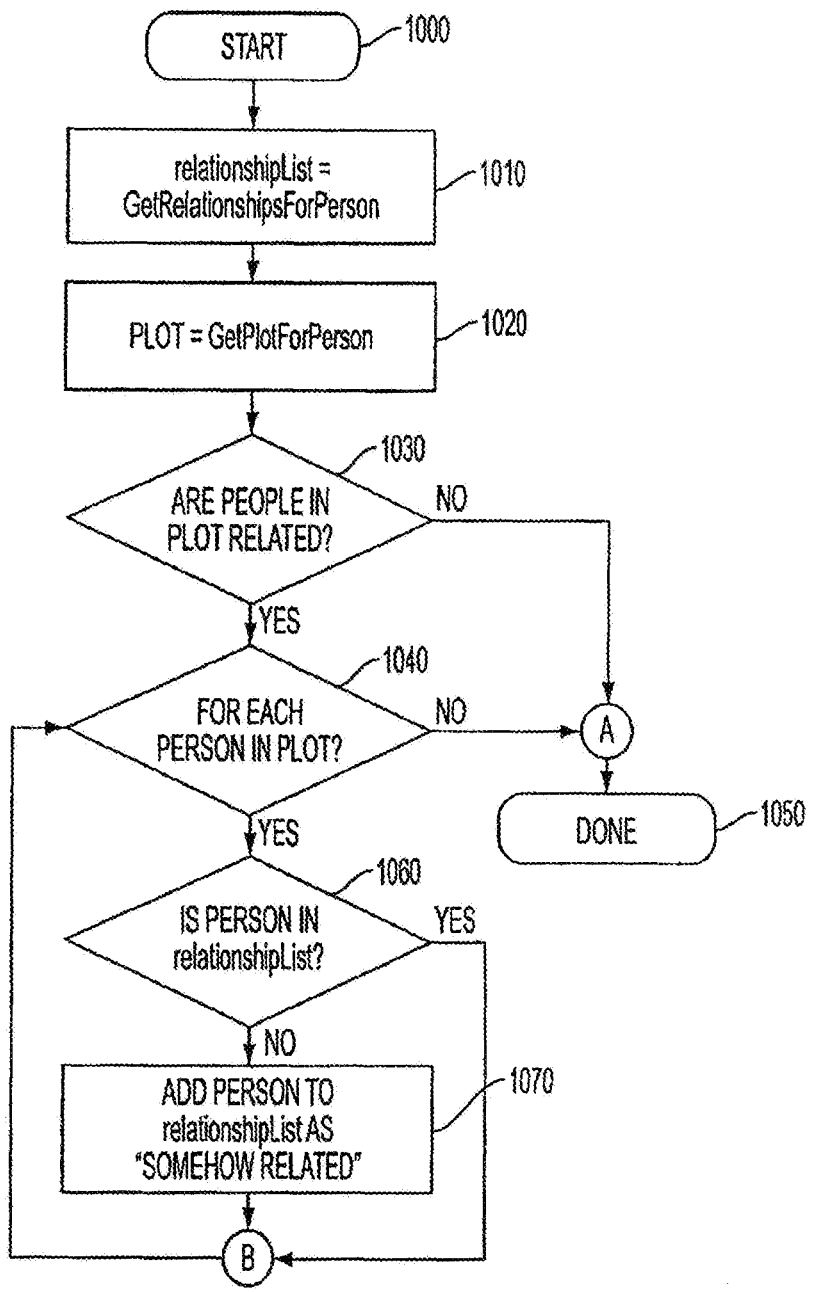
FIG. 4 is a flowchart showing an algorithm for propagating "somehow" or possible relationships.

FIG. 4 shows a process flow in accordance with one or more embodiments of the invention for determining and propagating the "somehow" or possible relationships for two or more individuals buried in a single cemetery plot. In these embodiments, the process flow starts (Step 1000) by retrieving relationship lists for individuals (step 1010) and retrieving plot information identifying the two or more individuals or persons buried in the single plot (step 1020). Using the relationship lists and plot information, it is then determined if a first set of individuals in the plot are "somehow" or possibly related (step 1030), such as by the approaches described above (i.e., related, somehow related, most likely related, may be related, may be unrelated, most likely unrelated, somehow unrelated, and unrelated). If the individuals are not related (i.e., may be unrelated, most likely unrelated, somehow unrelated, and unrelated), then the process proceeds to step A where the process flow ends (step 1050). If it is determined that the individuals are "somehow" or possibly related, then the process flow continues to the next step (step 1040) where all other determinations are made as to whether or not individuals within a given plot are related to one another. If they are unrelated, the process flow ends (Step 1050). However, if the individuals buried in the single plot are "somehow" or possibly related it is then determined whether or not the person is listed in the retrieved relationship lists (step 1060). If so, the process proceeds to step B where this flow is repeated for all persons within the plot. If the person is not listed in the retrieved relationship lists, then the identification of the person is added to the relationship lists (step 1070) so that their information may be implemented in the process flow.

The various embodiments of the invention may also be implemented to introduce the attribute of degrees of relatedness and the propagation of this fuzzy relationship to other individuals in a fixed centroid. For example, in FIG. 4 if two individuals with different surnames buried in the same plot are determined to be somehow related, then all the members within the same plot will be considered to be "somehow" related.

Moreover, if any one member of a defined pedigree lineage has a fuzzy relationship with an individual, then the relationship status of that individual is propagated to all known members of the pedigree.

The various embodiments of the invention also provide the ability for any registered user to override any and all fuzzy relationships and collapse them to traditional defined pedigree relationships (with source citations) or no relationships (also with source citations).

For instance, a working example of the invention may utilize a combination of relational data at the person/relationship level for specific relationships, relational data between people and centroids, and a procedural mechanism to retrieve a relationship list for a person that combines this data.

Relationships also have beginning and ending dates. These dates utilize the varying resolutions described above.

Locations

Locations are described and stored in two preferred manners. The first is geographic coordinates of longitude and latitude and the second is an address, such as, a specific street address or more general town or ZIP code address. Locations may also include elevation or height above the earth at a given coordinate.

Cemetery Workflow

Interested individuals and local historical societies regularly engage in the practice of transcribing cemeteries to help in the cause of capturing genealogical data for posterity. However, current practices for capturing this data are inefficient and fail to capture a majority of the available information. Further, typical current outputs of this activity are unstructured, text based representations of the buried persons with some data from their stones, such as, birth and death dates. Additionally, current data is visualized and reported in an alphabetical manner, such that, it loses much, if not all, of the geo-spatial context of the buried individual(s)/person(s).

In one or more embodiments, geographically oriented genealogical data is retrieved, stored and organized by starting with the transcription of data available in cemeteries. The various embodiments of the invention provide structured methodologies and storage for efficiently recording significantly greater amounts of information from cemeteries as compared to current practices. In so doing, one or more embodiments of the invention include and implement digital cameras, mobile devices, GPS-enabled digital devices, personal computers, the internet, and the like. The invention provides a rich and detailed record of cemeteries including locations, images, plots, stones, people and relationships between people.

In one or more embodiments, the invention involves activities by persons performing different roles, which may be performed by the same person or different people. These roles may include, for instance, a photographer taking digital photographs of cemeteries, as well as the individual headstones and monuments within the cemetery. Preferably, these photographs are geo-coded. The photographs are also preferably taken in an organized manner to facilitate easier transcription. Other roles include a transcriber recording the information embodied in the photographs in a structured manner. This information may include, but is not limited to, names, dates, relationships, religion and military service as well as the photograph or photographs of the stones and their locations. Still another role is a Reviewer who is responsible for reviewing and approving the transcriptions.

Photography Workflow

Figure 5:
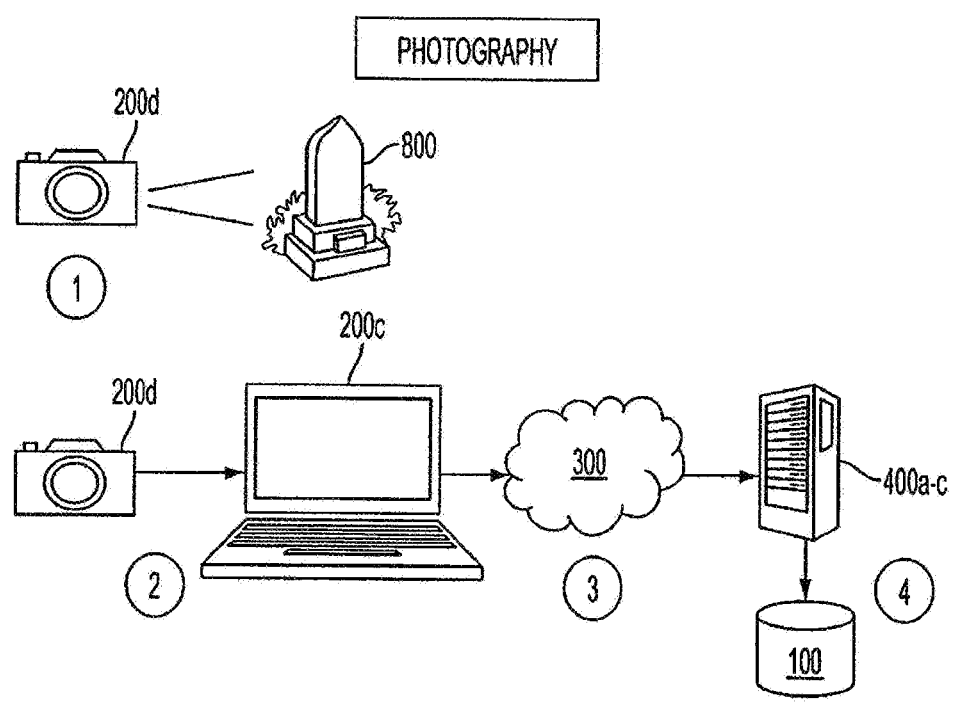
FIG. 5 is a flowchart of workflow in gathering photographic data from a cemetery plot.
Figure 6:
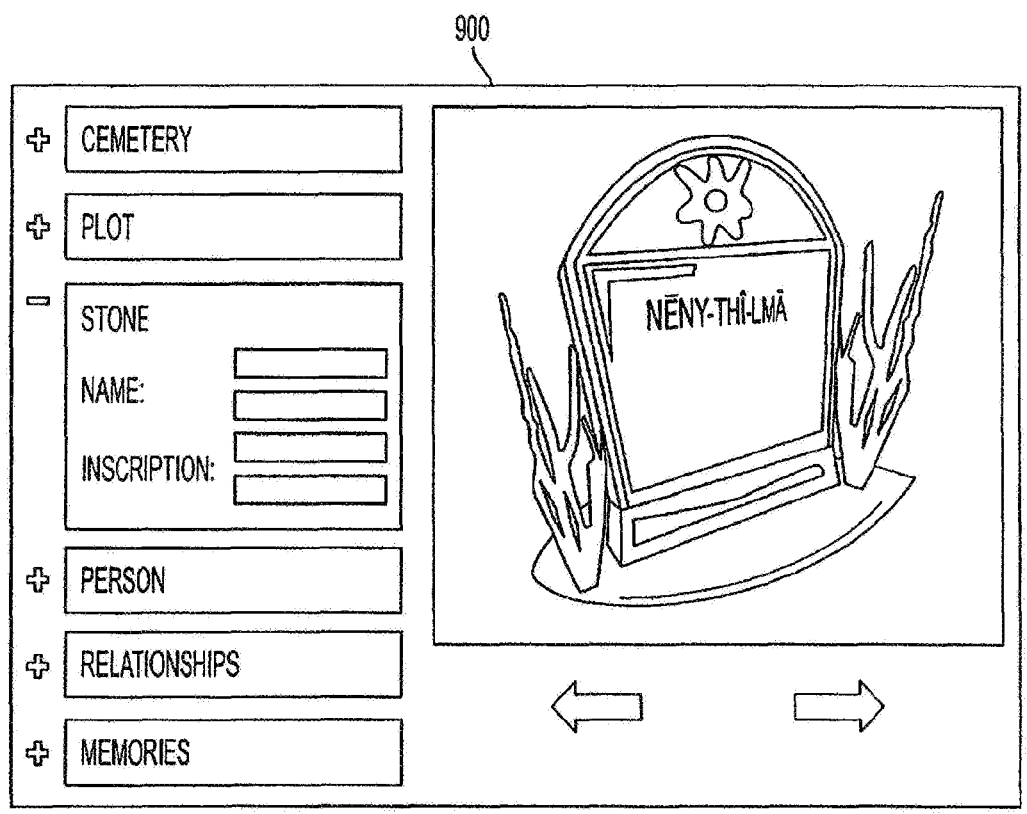
FIG. 6 is a display or user interface for transcribing the data of FIG. 5.

The activity of cemetery transcription involves processing a series of images or photographs taken in a cemetery, whereby the information captured in these images or photos is extrapolated and entered into the various embodiments of the invention as data for the individuals or persons that the pictures represent. FIG. 5 shows a workflow for gathering photographic data from a cemetery plot in accordance with one or more embodiments of the invention. FIG. 6 shows a display or user interface 900 for transcribing the data gathered in FIG. 5, whereby the main transcription screen may have data entry fields on one side and image/photo display(s) on an opposite side of the screen. In so doing, a transcriber may select an image/photo and extrapolate data there-from and enter such data into the present systems, apparatus and processes of the invention. Location data may also be set from any location data obtained from the photos.

Figure 7A:
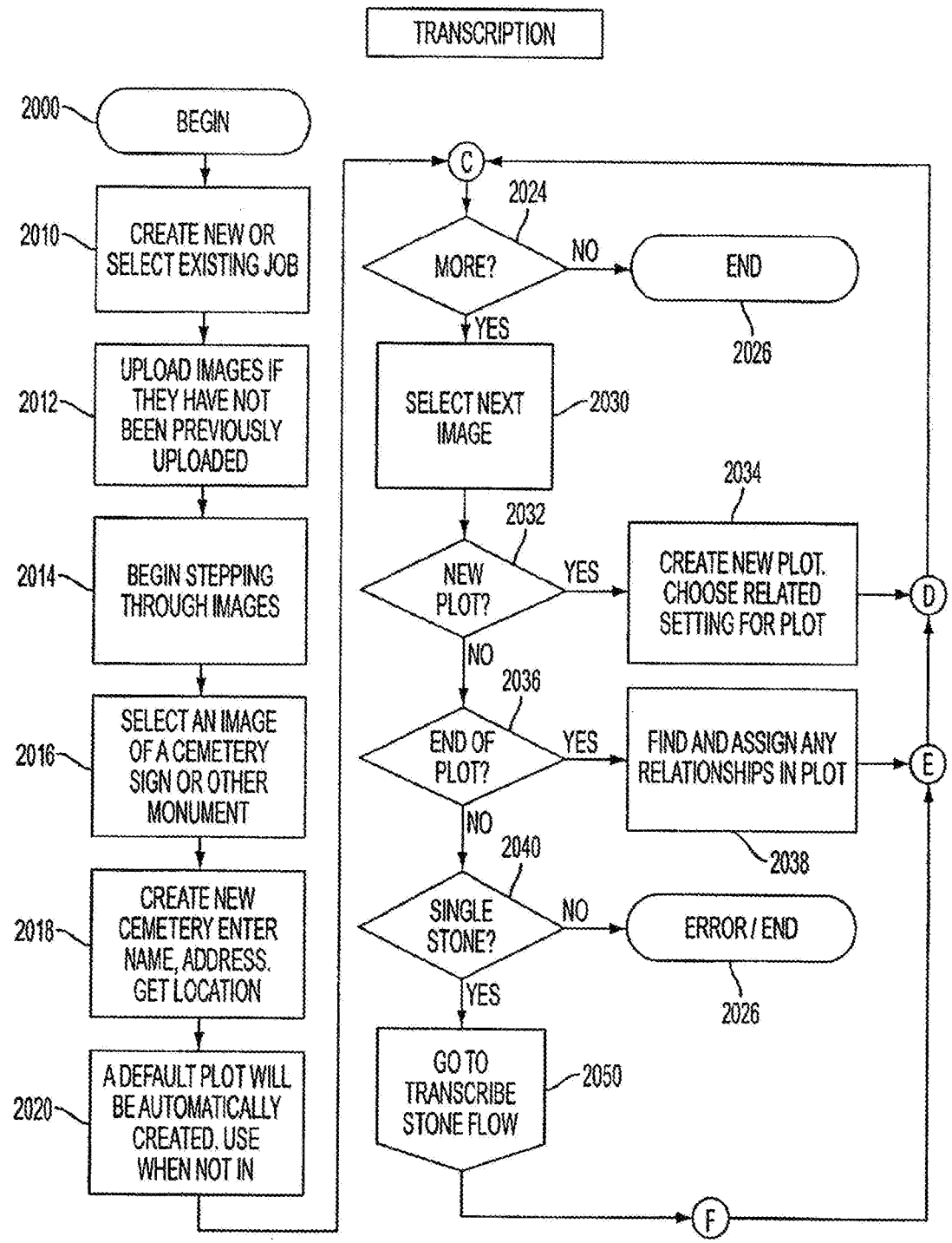
FIGS. 7a and 7b are flowcharts of workflow in gathering and transcribing data from a cemetery plot or other memorial.
Figure 7B:
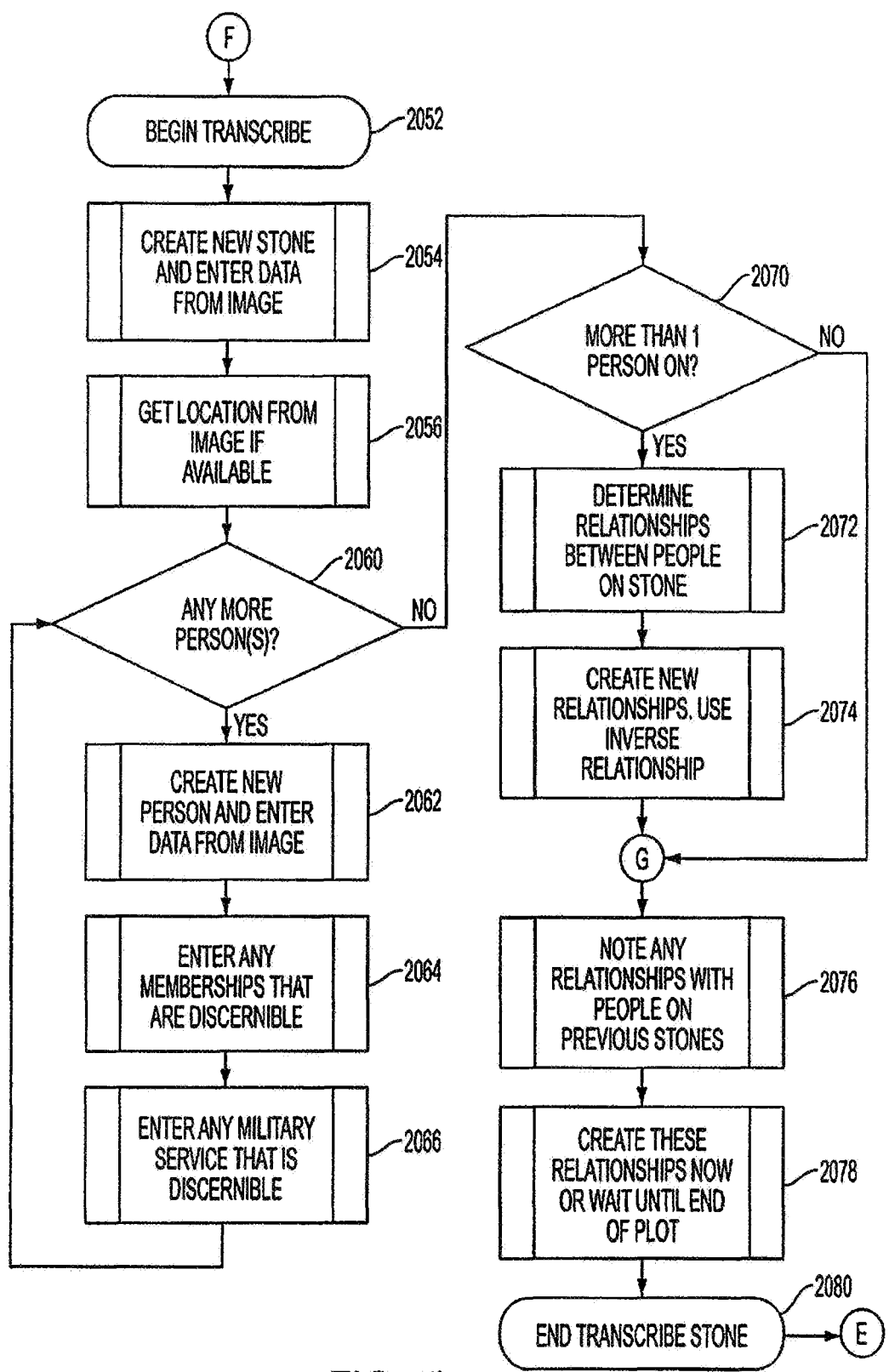

FIGS. 7a and 7b show one or more process flows of the invention for gathering and transcribing data from a cemetery plot or other memorial, such as, for those approaches shown in FIGS. 5-6. While not meant to be limiting, it should be appreciated that a variety of different process flows may exist without departing from the novel concepts of the present invention. For instance, transcribers may stop and/or start the processes at any stage and/or photographs may be uploaded into the invention individually or in batch modes.

In the various embodiments of the invention, a photographer and a transcriber may be the same person or different persons. As shown in FIG. 5, the photographer first takes a photograph of a cemetery stone or plot (step 1). Since the photographer and transcriber may be different people or the same person performing both tasks at separate times, it is important that the photographs be taken in an order that conveys information.

Also, the photographer(s) may determine plot boundaries while on site, and communicate these boundaries to the transcriber to indicate that a set of stones are part of a specific plot. Cemetery plots are often demarcated by corner monuments or other means and these attributes may be used to determine the plot boundaries. Other attributes that may be used to generate plot boundaries may include a photograph of a first indicator card (e.g., a colored card (green card), a card that recites start, etc.) at the start of a plot and a photograph of a second indicator card (e.g., a different colored card (red card), a card that recites end, etc.) at the end of a plot. One or more photographs of the plot as whole may also be taken and can be associated with the plot data. In generating plot boundaries, a photograph may be taken to mark the start of a plot and after all members of a plot are photographed a subsequent photograph is taken marking the end of the plot. The plot starting and ending photographs may be of a standard item that makes and defines them as identifiable members of a given plot.

Once the photographs are taken, these photographs are uploaded either individually or in batch mode from the picture taking device 200d (e.g., camera, mobile phone, etc.) (step 2) onto a computer 200c by any appropriate means, e.g. transfer via cable, transfer of memory chip to computer. The photographs are then uploaded to a database 100 via the internet 300 and servers 400 (steps 2, 3) for use by the transcriber. It should be appreciated that steps 2 and 3 may be combined when the picture taking device 200d is included in a device that has communication capabilities (e.g., a mobile phone), whereby the images are uploaded directly to the database without the need for a separate computer 200c to perform the upload tasks.

After the photography data has been uploaded to the database, this data is then displayed to a transcriber, such as on a user interface 900 as shown in FIG. 6, for transcribing or extrapolating the data. FIGS. 7a-b show the process flow of transcribing the data gathered by the photography stage. The transcription stage at least determines whether any plot boundaries exist and determines any relationships as described in detail above within the determined plot.

The process begins (step 2000) by creating a new job or selecting an existing job (step 2010), uploading any photographs that have not been previously uploaded (step 2012), and beginning reviewing the uploaded images (step 2014). An image that identifies a particular cemetery (e.g., a cemetery sign, cemetery monument, etc.) is first selected (step 2016) and if it is a new cemetery that is not already identified or registered with the invention this new information (e.g., cemetery name, address, location, coordinates, etc.) is retrieved from the photograph or other identifying images/material supplied by the photographer and entered into the systems and apparatus of the invention (step 2018).

Once the identification and coordinates of a given cemetery is determined, a default plot is automatically established within the invention (step 2020). The process flow proceeds to determining whether or not any more images have been uploaded for the selected cemetery (step 2024), and if not, the process flow ends (step 2026). If there are more images relating to the selected cemetery then the next image is selected (step 2030), followed by determining whether this next image is the beginning marker for a new plot (step 2032). If the next image is the beginning of a plot, then a new plot is started and any and all related settings for such plot are associated therewith (step 2034).

The process repeats back to determining whether or not any more images exist after the previous image, and if not the process ends (step 2026). If more images do exist, the next image is selected and this process is repeated for each image until it is determined that one of the images is the end-marker of the plot (step 2036). Once the end-marker image has been identified (and as such, the boundaries of the plot identified), any and all relationships within the identified bound plot are retrieved and assigned to the individuals within such bound plot (step 2038). The process flow of steps 2024-2038 may be repeated if it is determined that another image exists for the bound plot in step 2024.

In the event that the first image retrieved is not associated with a new plot (step 2032) nor is it an end-marker of a plot (step 2036), it is then determined if the image is that of a single stone in a cemetery (step 2040). If it is not a single stone, then a default error occurs and the process flow ends (step 2026). However, if the image is that of a single stone then the process flow continues by transcribing or extrapolating the data from the stone (step 2050). One or more embodiments of this process flow are shown in FIG. 7b, which is described below.

If the image being transcribed is that of a single stone, the stone is transcribed (step 2052) by creating a file for a new stone and entering any genealogical relevant data viewable on the image of the stone (step 2054), including that of the location of the stone if such information is available (step 2056). These steps are performed for all person(s)/individual(s) listed on the stone by generating for each person/individual (step 2060) listed thereon a file containing an identifier of each person along with any other data that is obtainable from the stone for such person (step 2062). This includes entering any discernable membership data (step 2064), and military service data (step 2066), and the like.

Once these steps and data files are generated for all persons listed on the stone the process then determines whether one or more persons are listed on the stone (step 2070). If more than one person is listed on the stone, the relationships are determined between the individuals identified on the stone (step 2072) followed by creating any new relationships that may be found to exist in accordance with the invention (step 2074). This may be accomplished by using the inverse relationships of the invention.

After relationships on a single stone have been determined, or if there is only one person listed or identified on the stone, relationships with people on previously reviewed and extrapolated stones are determined and input into the systems and apparatus of the invention (step 2078). These relationships identified from different stones may be input after each relationship is determined or at the end of analyzing an entire plot of stones (step 2078). Once the stone transcription process is complete, this data may be used in determining and extrapolating relationships for a given plot.

Census, Event, and Memory Transcription Embodiments

Census:

While FIGS. 5-7b relate to transcribing data from a cemetery setting, it should be appreciated and understood that the invention may be implemented with any type of genealogical or person(s) identifying data. For instance, one or more embodiments may provide for transcribing data from federal and state census records into a common format utilized in accordance with the invention. The transcription front-end interface of the invention is designed such that the entry method mimics the form that the data is commonly available in the year and location the census was taken. This provides for an efficient and effective transcription workflow.

Other embodiments also provide for transcribing vital records into a common format of the invention. Vital Records are records maintained by civil authorities that record critical life events including, but not limited to, births, deaths, divorces, and marriages. Each vital record not only includes pedigree information, but it also includes location based information, such as, where someone was born, where someone died, where someone was married, or where a divorce was decreed.

Again, it should be appreciated that the data transcribed in accordance with the various embodiments of the invention is not stored in a manner that is specific to census or vital records, but rather in common formats that allow searching, visualization, location aware prompts and tools to explore, enhance and derive information about people, their lives and their relationships with other people both in terms of genetic relationships and common events and activities in their lives for genealogists and researchers of the past. That is, the present transcription tools allow for the gathering, entering and exploitation of data from multiple different sources including, but not limited to, public physical memorials (e.g. cemeteries), public records (e.g. vital records and census records), electronic sources (e.g. databases), personal (e.g. entered from an individual's knowledge), personal vital records including, for example, memories and/or events (as discussed further below), and the like. The transcription tools take all of these different types of data and convert and consolidate it all into a common format. These transcription approaches of the invention are fundamentally different from currently existing systems, which are limited to providing access to separate databases that are individually queried using search parameter(s), and then the data obtained being indexed in accordance with the format that is specific to the searched database.

The one or more embodiments of the invention provide an improved and more powerful user experience allowing users to relate and visualize the gathered data in a unique manner that provides improved genealogical search results over that which is currently available. For instance, understandings and realizations of relationship linkages or relationship data may be obtained in accordance with the invention which might otherwise have been missed by the conventional approaches of searching individual census or vital records. Additionally, the relationship data may be shared by members of the user community allowing each user to collectively gain and share insights that they alone would not have a view or proper perspective thereof.

Memories:

Memories are a form of "personal vital records" that are remembrance(s) of any activity and/or event(s) associated with a particular location that are of significance to a person or persons. Memories may be recorded with an address, date or date range, description, optional pictures, videos or other attached elements. The use of generalized memories provides the invention with a level of hierarchy not implemented in current genealogical research approaches. In particular, memories provide a rich history of a person's life, and a mechanism to record a wide range of significant events in a person's life including, but not limited to, schooling, employment, celebrations, weddings or any other event chosen by the genealogist for capture.

One or more embodiments of the invention may implement the use of memory data to identify connections or relationship linkages between people through such memory data, regardless of whether particular memory data has been entered by separate people without knowledge of each other. This memory data may be searched with respected to location and time both visually and through queries. The use of memory data provides a new dimension to the hunt for genealogical information and/or relationship linkages.

Since data entered into the present embodiments of the invention will be collected overtime by potentially different people and from different sources, it is important for transcribers and users to be able to understand if the geo-spatial-centric data they are entering describes new people and events, or if it should be considered to be adding to the description of previously entered data by other individuals.

Components of the invention may aid in the enhancement of previously captured data. For instance, components of the invention may extend existing concepts of community-based information recording, such as Wiki type systems, for providing the ability to perform community-based geo-spatial capture and joining together information about the relationships between people, as well as between people and events and/or memories. This may include user-driven methods to join together information about individuals from different users that span a number of different locations, as well as the ability to join together information about locations across time and/or across a number of different individuals. For example, dozens of families may have lived in a home that was built in the US Colonial Period, or alternatively, a family may have lived in a dozen locations.

Geo-Coding Locations

The invention is also suitable for use with data pertaining to geo-coding of historical locations that are referred to differently over time. Political boundaries across the globe have changed throughout human history by conquest, annexation, warfare, treaty, plebiscite, legislation, and other means. Geo-locations provide specific longitude and latitude points that are constant. If a physical location is properly geo-coded it can be referred to and displayed correctly even if the political unit it is affiliated with changes over time.

A current challenge for researchers is that location-centric data acquired from historical records describes locations based on political boundaries that were only valid at the time of capture, and may no longer exist or have been materially changed at the time/day such data is being researched. The present invention provides accurate geo-coding from historical data even when these boundaries have changed. In so doing, the invention automatically combines digitized images and associated metadata of historical maps to underlying geo-spatial rendering engines, such as Google Earth, in both data capture and data visualization as a function of the temporal value of the geo-spatial record. This allows location centric data to be co-presented in the historical geo-spatial political context as well as current day to assist in geo-coding in data entry and visualization of data queries.

This mechanism can be automatically extended as new cases of boundary changes at points in time that are discovered and made aware to the system. Geo-coding from historical data has application both in genealogy and outside of it, and the present invention discloses and provides for general use of this concept.

Geo-Temporal Visualization and Analytical Embodiments

The various embodiments of the invention provide unique systems, methods and computer program media and/or products for visualizing how people lived their lives and the relationships between people, events, and locations. These visualization embodiments provide valuable insight into data that aids researchers in discovering information that may not otherwise be obtainable. In so doing, the invention utilizes both time and space, including both 2 and 3 dimensional space, in combination with the data captured via the data capture embodiments discussed above to generate geo-temporal visualization data that is interactively displayed to users.

In one or more embodiments, the visualized data elements may include, but are not limited to, objects, events, organizations, memories and other entities having specific locations, dates and times of where and when they occurred that are of interest to a given person. In other embodiments, the visualized data elements may include, but are not limited to, relationships between entities having type information and/or descriptions, as well as having date, time or date time ranges. The visualized data elements may further include, but are not limited to, virtual entities that represent people or other entities whereby these virtual entities help to group, relate, visualize, understand and provide insight into the visualized data. It should be appreciated that the visualized data may also include any combination of the foregoing.

Figure 8:
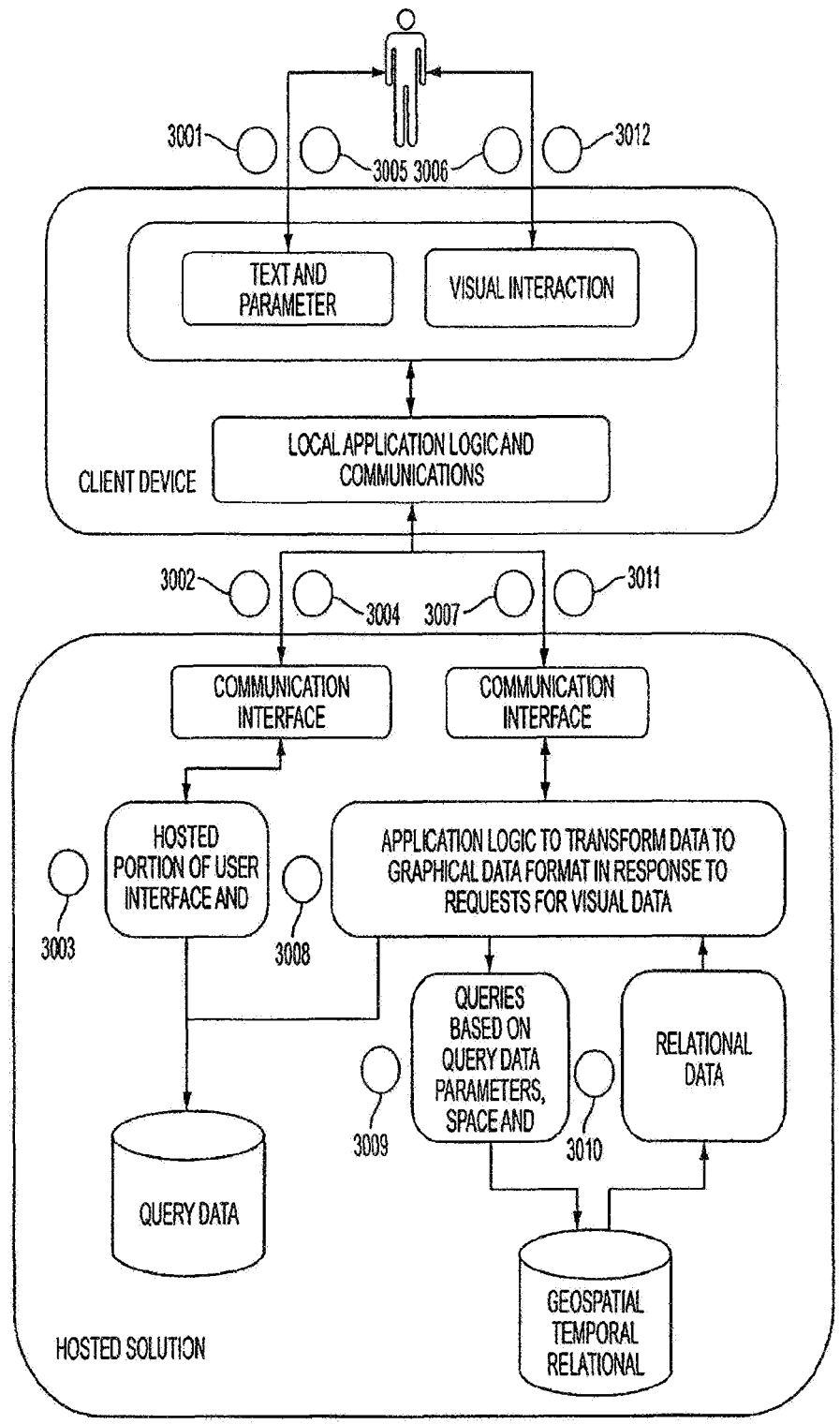
FIG. 8 is a flowchart of the information visualization system of the present invention.

Information Visualization System:

FIG. 8 shows an embodiment of a flowchart and process flow of an Information Visualization System of the invention. It should be appreciated that a user may interact with the present invention through a variety of different types of electronic devices, whether mobile or stationary. In some embodiments, the user will implement the use of an electronic device that is separate from the core servers containing the database and code functionality of the present invention. For instance, the electronic device may be a personal computer having a standard browser, a browser with specific or general plug-ins or a client application. Alternatively, the electronic device may be mobile (portable) in nature, such as, a handheld device, a wearable computing device (e.g., a computing device worn on an individual's body (e.g., watch, pager, glasses, optically mounted head display, etc. each with a computing device)), or other device. Whether the electronic device(s) is mobile or stationary, it preferably has at least internet connectivity, a video display, a keyboard of some form, a pointing device (e.g., a mouse), audio capabilities, and the like.

For ease of understanding, the following steps and description refer to the Information Visualization System shown in FIG. 8.

Step 3001:

A user provides input into the invention through a user interface of a client device by a combination of entering query parameters that limit the search of data to their areas of interest, display parameters that indicate how to display the data, and direct interaction with the visual display data to zoom, pan, rotate, etc. The flow that is shown here starts with the user interacting with parameters that will affect the type of data that is or is to be displayed to the user.

There are multiple forms of client devices that interact over the internet with the hosted solution. The user interacts with the user interface on the client device which in turn communicates with the hosted solution. It should be appreciated that the user interface of the client device may take various forms with common denominators to each that information is displayed to the user on the client device and that each form provides input to the client device. The user interface may be hosted through a combination of functionality on the client device and the hosted solution, optionally with more functionality being provided on either the client or the host.

Examples of user interfaces suitable for use in the present invention include, but are not limited to, the user interface being a browser with all web pages served by the host, the user interface being a browser with an embedded plug-in to display geographic information, the user interface being a browser with an embedded plug-in that hosts application logic, the user interface being a client application, the user interface being an application that runs on a handheld mobile device, the user interface being a social networking site directed solely to or alternatively at least including genealogical research or familial linkages (e.g., a social networking site aimed at establishing a person or persons family tree), the user interface being a networking site directed to geo-temporal visualization data and mapping, and the like.

Step 3002:

The client device sends a request to the communication interface of the hosted solution along with the input data that has been entered or changed on the user interface.

Step 3003:

The hosted solution works in both a state-full and stateless manner. In instances when the application is hosted, the hosted solution maintains session state. Those parameters entered into the user interface that will affect the rendering of the visual representation of the geospatial data are stored in the query data store.

Step 3004:

Any data that is needed to refresh the user interface may be returned to the client device.

Step 3005:

Using this refreshed data, the client device then updates portions of the display that have changed, and an updated display is visualized by the user.

Step 3006:

In some instances, user interaction with the invention may result in the data visualization display needing to be updated. Alternatively, this may be triggered by the visualization system itself, such as, by periodic polling or device location events requesting data for a new location.

Step 3007:

When updating is required, requested or needed, the invention sends a request from the client device to a communication interface of the hosted solution to provide such updated data.

Step 3008:

The host system responds to this request by returning a representation of the geospatial data in a form that the visualization embodiment can use to render the data on the representation of a portion of the earth. The application logic fetches data from the query data store for the session and combines it with the query data from the visualization system.

Step 3009:

The application logic uses the combined query data as parameters for one or more queries sent to the geospatial, temporal relational database.

Step 3010:

Geospatial, temporal relational data obtained from the database is returned in relational form to the application logic.

Step 3011:

The application logic transforms the relational data into a format (such as KML) that can be interpreted by the visualization embodiment of the invention.

Step 3012:

The visualization renders the returned data into the current view of the earth, which may be 2 or 3 dimensional, and displays it to the user.

Figure 9:
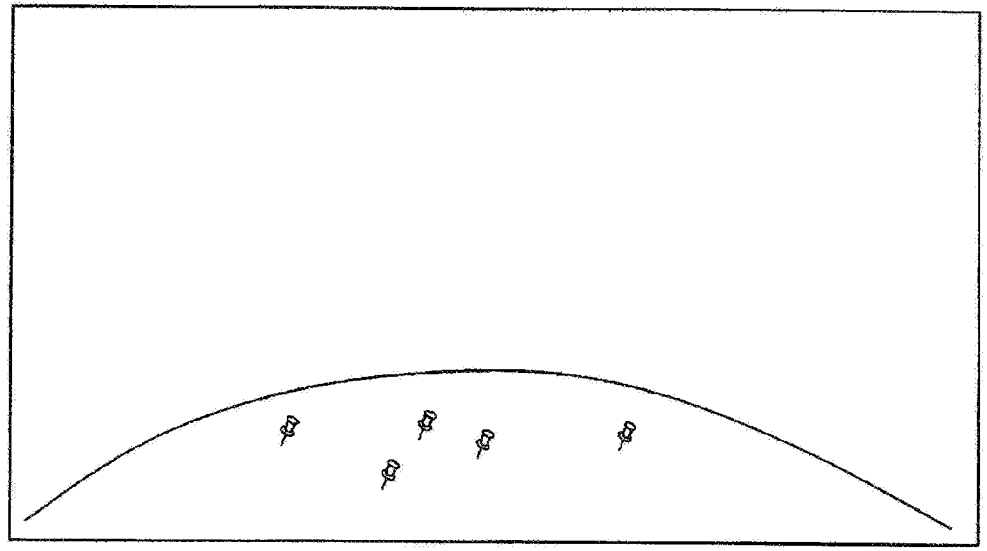
FIG. 9 is a display showing representation of individuals on a 3-dimensional rendering of the Earth.

FIGS. 9-13 illustrate various displays rendered by the invention for viewing by the user or users at the client device. Referring to FIG. 9, the invention may display a variety of different "Entities" on a 3-dimensional rendering or map of the earth. These entities may include, but are not limited to, cemeteries, plots, stones, memories, and the like. The different entities may be displayed with different representations to show different entity types, such as, different colors, different icons and the like. When rolled over they may display a highlighted representation that may also contain additional information. Also, when clicked or otherwise selected they may display details about the entity.

The invention may also be used to generate and display data depending upon "Levels of Service". In so doing, the invention may expose varying amounts of information to different categories or levels of users. Some information may be exposed to all anonymous users, additional information may be exposed to users who register with the service and even more information may be made available to paying customers. There may be a work sharing arrangement with respect to paying customers. For example, photographing a cemetery may count for x number of months subscription. There may also be recognition displayed for service to the online community.

One or more embodiments may be implemented with the notion of "Permission Based Advertising." Special advertising opportunities may exist in the visualization space due to a target audience being specifically interested in a particular service(s). For instance, while searching geographically a target audience may want to be shown resources that can help them with their search. This may include local experts, local historical societies, local lodging, etc. An end-user may be given the option to explicitly turn this feature on or off. The Permission Based Advertising of the invention both improves users' experiences by offering such users additional functionality while not cluttering their experience if they are not currently interested in it, and it provides a higher value advertising opportunity by offering adds to highly targeted potential customers.

Again, the various embodiments of the invention provide unique systems, methods and computer program media and/or products for visualizing "Relationships" between people as well as between people and entities that are associated with them. Discovering and understanding the relationships between people is critical to understanding our genealogical roots and establishing a familial linkage or tree. These Relationships may be displayed to a user by various connections, linkages, and/or visualized by connecting the entities.

In one or more embodiments, the established Relationships may be displayed by visually connecting related entities with vectors. The Relationships may also be animated displays over a time range of relationships and related entities. The invention also provides the ability to navigate between connected entities by selecting control handles located at each end of the relationship vectors. As such, the invention may provide for establishing unique family trees that have people and event related branches generated geo-spatially and over time. Representing relationships as connections between people spatially on the earth and over time provides significantly more information visually, as opposed to a traditional family tree that is established at a given time and location.

While these visualization concepts of the invention have broad application within the genealogical field (e.g., by generating a family tree based on Relationships between people and events geo-spatially and over time), it should be appreciated and understood that such visualizations of the invention have application outside of the field of genealogy (e.g., mapping out a mafia tour, etc.) Another application of the present visualizations outside of the genealogical field may include an online community networking that allows users to link with other users, whereby the present visualization techniques may be used to represent Relationships between such linked users.

Figure 10:
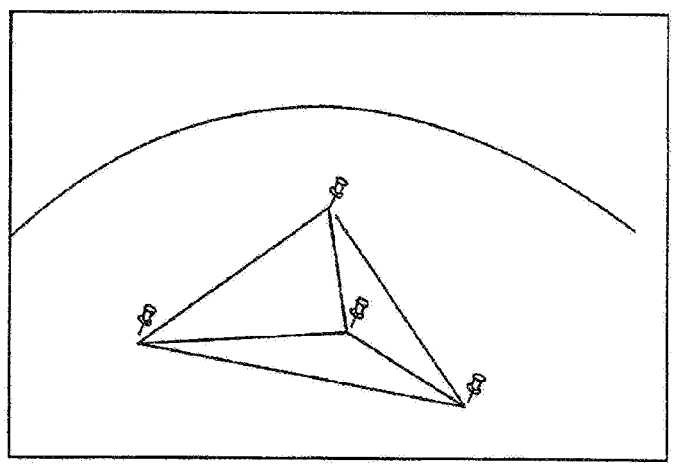
FIG. 10 is a display showing connection of related individuals on a 3-dimensional rendering of the Earth.

Referring to FIG. 10, a display showing connection of related individuals on a 3-dimensional rendering of the Earth is shown. These related individuals may be connected by color coding to show types of relationships, such as, spouse, parent/child, sibling, etc.

The invention also enables navigation between people and events on the earth. Selecting a person or other entity such as a monument or memory may cause navigation handles to be displayed for all of the entities that are related to the selected entity. That is, as people and their events are displayed visually, one can navigate between them automatically by selecting control handles. The viewpoint may be animated to the selected entity. Double clicking on one of these handles may cause the camera to move to the related entity, which provides a powerful approach for navigating through and exploring relationships.

Figure 11:
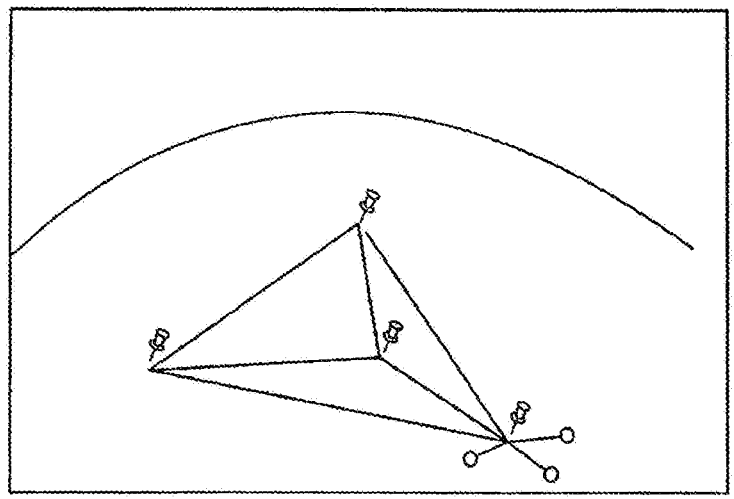
FIG. 11 is a display showing connection of additional related individuals on a 3-dimensional rendering of the Earth.

As shown in FIG. 11, the connection of additional related individuals may be added at any time during or after a session of the invention. For example, multiple wives, children and step children may be viewed both without respect to time as well as viewed over a specific time or time frame.

Figure 12:
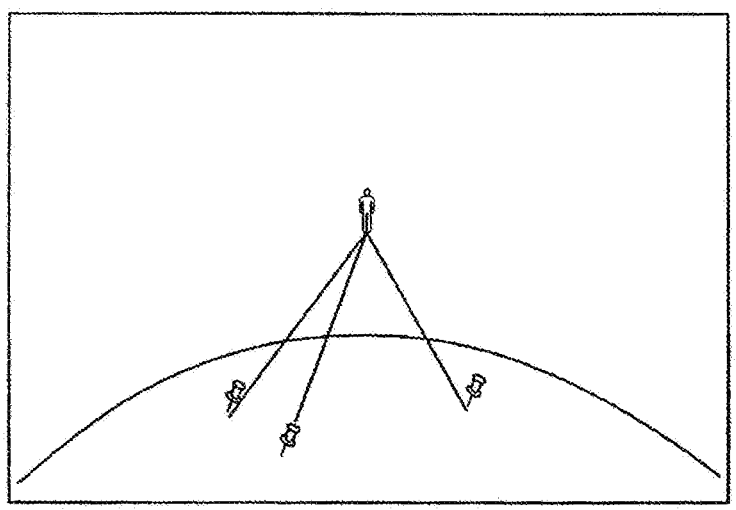
FIG. 12 is a display showing the depiction of virtual entities hovering over a map or 3-dimensional rendering of the Earth.
Figure 13:
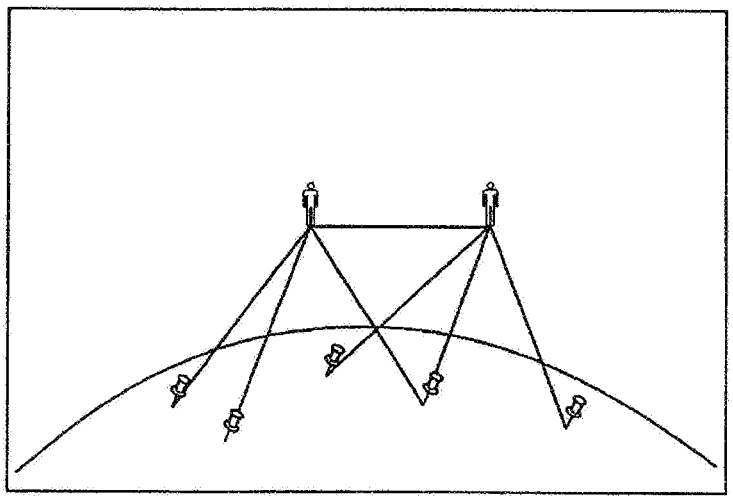
FIG. 13 is a display showing the depiction of virtual entities in different times over a 3-dimensional rendering of the Earth.

FIG. 12 refers to and depicts "Virtual Entities" positioned on maps or 3-dimensional representations of the Earth, while FIG. 13 depicts such Virtual Entities in different times over a 3-dimensional rendering of the Earth (i.e, "Time Stacking").

The concept of virtual entities (FIGS. 12 and 13) is introduced to visualize and group information logically. Virtual entities are visual and data elements that are not tied to a specific location but may be viewed and connected to location based entities and serve to connect such entities. An example of a virtual entity is a virtual person. A virtual person has a great many attributes but does not have a specific geographic location. Also, a virtual person may have many related entities and having a virtual representation of the person on a map serves an important purpose in linking those entities into a coherent linkage or relationship data.

A virtual person may be located at a longitude and latitude that is coincident with a related entity, is derived by some form of spatial averaging of related entities, or is set specifically for the virtual person. Further, the 3 dimensional space above the earth may be used for the virtual location above a given longitude and latitude. As such the present invention provides for visually linking related entities to virtual entities, and depicting these entities in a 3 dimensional space or rendering.

Time stacking (FIG. 13) is defined as using the vertical axis above the earth to represent time. This allows the visualization and navigation of events over time by moving the camera location up and down over the earth. For example, memories and a specific location may be visualized by stacking them above each other in time sequence. The vertical axis extending from the earth is then considered as time rather than simple altitude. The present invention provides the use of this space in this manner and the visualization techniques that may be associated with it.

The invention provides for representing the accuracy and/or quality of geo-coded results visually from a height above the ground to provide views that approximate the viewed area described by the accuracy. This height may be generalized, e.g. a certain height for all state level accuracies or may be made more specific by providing a height based on the dimensions of the given state. The use of height is only one example of visualization techniques. Other examples may include field of view or width of viewport.

One or more embodiments of the invention also provide for a mobile device(s) that is/are geo-aware (i.e., device that is aware of, or capable of determining and identifying, its physical location (e.g., geo-fences/virtual perimeters, etc.)). These mobile devices may have, for instance, a slider or some other control that allows one to select a point in time and provide information of that point on the earth at time. For instance, a history view may be provided in the device's field of view for viewing by the user. Uses include field based research and historical tours.

The invention may also be used for location aware research and/or location aware groups. A location aware device may be used to provide alerts of topics of interest near the point on Earth that the device is located. As for location aware groups, social networking/collaborative research groups may define points of interest and allow members to be notified that they are in the vicinity of those points.

Various embodiments of the invention also allow for adding and subtracting from a result set based on parameters. This is particularly useful for complex searches where displayed results may be incrementally refined until a desired result has been reached. For example, an initial search of values within a radius of a point may be refined by subtracting points within a smaller radius of a different point. This may also be done within a certain date range, while not within another date range. Composite searches may be captured by multiple ordered sets of parameters and executed in multiple steps in the particular order. The invention also involves the specification and replay of these queries against a increasingly refined result set.

It should be appreciated and understood that the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The following embodiments were chosen and described in order to best explain the principles of the invention and the practical application, and to enable others of ordinary skill in the art to understand the invention for various embodiments with various modifications as are suited to the particular use contemplated.

While the present invention has been particularly described, in conjunction with one or more specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of identifying and associating individuals comprising:
   providing a first set of records associated with one or more individuals at a defined geographic location and a defined period of time;
   providing a second set of records associated with one or more individuals across multiple geographic locations and defined time periods;
   on a computing device, selecting a desired demarcated area on the Earth;
   on the computing device, identifying a set of individuals corresponding to the selected demarcated area and the desired date range, the first or second set of records include identifications of locations of origin of an individual and wherein the identified set of individuals are in contemporaneous geospatial proximity:
   associating relationships among the set of identified individuals who previously had no identified relationships in the first and second sets of records corresponding to the demarcated area and the desired date range including identifying the preponderance of the location of origin of the identified set of individuals, and using the preponderance of the location of origin to associate the location of origin relationships among the set of identified individuals who previously had no identified location of origin relationships in the first and second sets of records; and
   outputting results of the associated relationships among the set of identified individuals to provide results of known and probable relationships in the defined geographic location over the defined period of time.

2. The method of claim 1 wherein the first set of records includes data selected from the group consisting of vital records, historical records, affiliation records, group census records, directories, pedigree records, genealogical records, lineage records, ancestral records, family history records, transcribed geotagged digital images of headstones, transcribed geotagged digital images of family plots, transcribed geotagged digital images of inscribed memorials, locations of transcribed geotagged digital images, identifications of physical proximity of imaged headstones and inscribed memorials within a physically demarcated area, group affiliation of transcribed individuals, or any combination thereof.

3. The method of claim 1 further including identifying isolated geographical locations in the records that include the identified individuals, and using the identification of isolated geographical locations to associate the relationships among the set of identified individuals who previously had no identified relationships in the first and second sets of records.

4. The method of claim 1 wherein the method is performed on and the results displayed on a social networking site.

5. The method of claim 1 wherein the computing device comprises a mobile computing device or a portable computing device.

6. The method of claim 5 wherein the demarcated area on the Earth is selected by pointing the computing device at said demarcated area on the Earth.

7. The method of claim 5 wherein the computing device comprises a location-aware computing device.

8. The method of claim 7 wherein the computing device comprises a geo-aware computing device, the geo-aware computing device selecting the demarcated area on the Earth by detecting and identifying virtual perimeters of said demarcated area on the Earth once said geo-aware computing device resides at said demarcated area on the Earth.

9. The method of claim 8 wherein the results of the associated relationships are displayed on a virtual display of said geo-aware computing device and overlap a display of said demarcated area on the Earth.

10. The method of claim 8 wherein the virtual perimeters of said demarcated area on the Earth encompasses one or more physical structure associated with records of human activity selected from the group consisting of inscribed memorials, geotagged digital images of inscribed memorials, buildings, homes, apartments, churches, factories, offices, ports, cemeteries or modes of transportation.

11. The method of claim 8 wherein the virtual perimeters of said demarcated area on the Earth encompasses one or more records selected from the group consisting of vital records, historical records, affiliation records, group census records, directories, pedigree records, genealogical records, lineage records, ancestral records, family history records, transcribed geotagged digital images of headstones, transcribed geotagged digital images of family plots, transcribed geotagged digital images of inscribed memorials, locations of transcribed geotagged digital images, identifications of physical proximity of imaged headstones and inscribed memorials within a physically demarcated area, group affiliation of transcribed individuals, or any combination thereof.

12. The method of claim 1 wherein the computing device comprises a wearable computing device.

13. A method of identifying and associating individuals comprising:
providing a first set of records associated with one or more individuals at a defined geographic location and a defined period of time;
providing a second set of records associated with one or more individuals across multiple geographic locations and defined time periods;
on a computing device, selecting a desired demarcated area on the Earth;
on the computing device, identifying a set of individuals corresponding to the selected demarcated area and the desired date range;
selecting one or more desired individual attributes on the computing device;
on the computing device, searching, identifying, and returning linked and related data elements of individuals and entities corresponding to the selected individual attributes, the demarcated area of the Earth and the desired date range;
associating relationships among the set of identified individuals who previously had no identified relationships in the first and second sets of records corresponding to the demarcated area and the desired date range; and
outputting results of the associated relationships among the set of identified individuals to provide results of known and probable relationships in the defined geographic location over the defined period of time; and
displaying results of one or more of a) relationship between the identified individuals and entities within a geo-spatial and temporal context, b) related data elements of the identified individuals and entities within a geo-spatial and temporal context and c) resolution of location information associated with the identified individuals and entities within a geo-spatial and temporal context, to allow a user visualize individuals and entities and their relationships to each other in the defined geographic location over the defined period of time.

14. The method of claim 5 further comprising:
providing a third set of records of probable genealogical relationships among two or more individuals across multiple geographic locations and time periods;
providing a fourth set of historical records associated with one or more entities at a defined geographic location and a defined period of time;
providing a fifth set of spatial, geographical, historical, and other records associated with one or more locations within a defined time period; and
providing an association of at least two of the first, second, third, fourth and fifth set of records into linked and related data elements comprising individuals, entities, geographical location, desired date range of association, and their relationships, and using said associations to generate said linked and related data elements of individuals and entities.

15. The method of claim 13 wherein the desired demarcated area of the Earth is identified as a parameter extant in the desired date range selected from the group consisting of a current location of the user on the Earth (latitude and longitude) and a maximum travel time T, a specific point on the Earth (latitude and longitude) and a radius R, a specific physical address and a radius R, one or more defined boundaries, a cadastral map or maps, a historical map or maps, an established neighborhood, a census enumeration district, a USGS Feature Name and radius R, a user defined boundary, or any combination thereof.

16. The method of claim 13 wherein the desired demarcated area of the Earth is identified as a current location of the user on the Earth (latitude and longitude) and a radius R, the current location of the user being a geocoded street address or derived from a global positioning systems receiving device.

17. The method of claim 13 wherein a representation of identified individuals, entities, their relationships to each other, and related data elements are displayed on a two-dimensional map on the monitor of the computing device with a recommended route of travel to a set of locations associated with the set of identified individuals and entities and the user's current location with an audible notification.

18. The method of claim 13 wherein a representation of identified individuals, entities, their relationships to each other, and related data elements are displayed on the monitor of the computing device as hovering over a 3 dimensional rendering of the Earth within the user selectable time period, the relationship representation of identified individuals and entities being displayed as connections to one or more associated locations within the 3 dimensional rendering of the Earth.

19. The method of claim 18 wherein the relationship representation of identified individuals and entities are displayed as connected to one or more associated locations through colored line segments, to each other through colored line segments or as connected to related data elements through colored lined segments.

20. The method of claim 13 wherein the first set of records includes data selected from the group consisting of vital records, historical records, affiliation records, group census records, directories, pedigree records, genealogical records, lineage records, ancestral records, family history records, transcribed geotagged digital images of headstones, transcribed geotagged digital images of family plots, transcribed geotagged digital images of inscribed memorials, locations of transcribed geotagged digital images, identifications of physical proximity of imaged headstones and inscribed memorials within a physically demarcated area, group affiliation of transcribed individuals, or any combination thereof.

21. The method of claim 13 further including identifying isolated geographical locations in the records that include the identified individuals, and using the identification of isolated geographical locations to associate the relationships among the set of identified individuals who previously had no identified relationships in the first and second sets of records.

22. The method of claim 13 wherein the method is performed on and the results displayed on a social networking site.

23. The method of claim 13 wherein the computing device comprises a mobile computing device or a portable computing device.

24. The method of claim 23 wherein the demarcated area on the Earth is selected by pointing the computing device at said demarcated area on the Earth.

25. The method of claim 23 wherein the computing device comprises a location-aware computing device.

26. The method of claim 25 wherein the computing device comprises a geo-aware computing device, the geo-aware computing device selecting the demarcated area on the Earth by detecting and identifying virtual perimeters of said demarcated area on the Earth once said geo-aware computing device resides at said demarcated area on the Earth.

27. The method of claim 26 wherein the results of the associated relationships are displayed on a virtual display of said geo-aware computing device and overlap a display of said demarcated area on the Earth.

28. The method of claim 26 wherein the virtual perimeters of said demarcated area on the Earth encompasses one or more physical structure associated with records of human activity selected from the group consisting of inscribed memorials, geotagged digital images of inscribed memorials, buildings, homes, apartments, churches, factories, offices, ports, cemeteries or modes of transportation.

29. The method of claim 26 wherein the virtual perimeters of said demarcated area on the Earth encompasses one or more records selected from the group consisting of vital records, historical records, affiliation records, group census records, directories, pedigree records, genealogical records, lineage records, ancestral records, family history records, transcribed geotagged digital images of headstones, transcribed geotagged digital images of family plots, transcribed geotagged digital images of inscribed memorials, locations of transcribed geotagged digital images, identifications of physical proximity of imaged headstones and inscribed memorials within a physically demarcated area, group affiliation of transcribed individuals, or any combination thereof.

30. The method of claim 13 wherein the computing device comprises a wearable computing device.

* * * * *